United States Patent
Missig et al.

(10) Patent No.: US 10,572,103 B2
(45) Date of Patent: Feb. 25, 2020

(54) TIMELINE VIEW OF RECENTLY OPENED DOCUMENTS

(71) Applicant: Apple Inc., Cupertino, CA (US)

(72) Inventors: Julian K. Missig, Redwood City, CA (US); May-Li Khoe, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 488 days.

(21) Appl. No.: 14/503,358

(22) Filed: Sep. 30, 2014

(65) Prior Publication Data

US 2016/0092043 A1    Mar. 31, 2016

(51) Int. Cl.
*G06F 3/0482*    (2013.01)

(52) U.S. Cl.
CPC .................... *G06F 3/0482* (2013.01)

(58) Field of Classification Search
CPC ......... G06F 3/048–04886; G06F 9/461; G06F 9/4443
See application file for complete search history.

(56) References Cited

U.S. PATENT DOCUMENTS

| | | | | |
|---|---|---|---|---|
| 5,754,179 A * | 5/1998 | Hocker | ............... | G06F 3/0481 715/835 |
| 5,920,316 A * | 7/1999 | Oran | .................. | G06F 3/0481 715/779 |
| 6,101,506 A * | 8/2000 | Ukai | .................. | G06F 3/0482 707/679 |
| 6,756,999 B2 | 6/2004 | Stoakely et al. | | |
| 2008/0126979 A1 * | 5/2008 | Abe | ............... | G06F 17/3028 715/781 |
| 2008/0165210 A1 * | 7/2008 | Platzer | ............... | G06F 3/0485 345/672 |
| 2008/0167937 A1 | 7/2008 | Coughlin et al. | | |
| 2009/0210261 A1 | 8/2009 | Mortimore, Jr. | | |
| 2010/0175001 A1 | 7/2010 | Lazarus et al. | | |
| 2010/0179750 A1 | 7/2010 | Gum | | |
| 2010/0228574 A1 | 9/2010 | Mundinger et al. | | |
| 2010/0291950 A1 | 11/2010 | Lin et al. | | |

(Continued)

OTHER PUBLICATIONS

50PLY, "GoTime", http/web.archive.org/web/20120423192355/http://itunes.apple.com/app/gotime/id463305124?, dated Apr. 23, 2014, 2 pages.

(Continued)

*Primary Examiner* — Ryan F Pitaro
(74) *Attorney, Agent, or Firm* — Morgan, Lewis & Bockius LLP

(57) ABSTRACT

Some embodiments provide a method for displaying a graphical user interface (GUI) for an electronic device. The method receives input to display files recently opened on the electronic device. In response to the input, the method displays a chronologically-arranged graphical representation of files recently opened on the electronic device from two or more applications that operate on the electronic device. The files are arranged in several groups based on when the files were open on the electronic device. A first group of the several groups is selectable to initiate opening of several files in the first group so that the files in the first group are open concurrently. A second group of the several groups is selectable to initiate opening of several files in the second group so that the files in the second group are open concurrently.

37 Claims, 14 Drawing Sheets

(56) References Cited

U.S. PATENT DOCUMENTS

| | | |
|---|---|---|
| 2011/0077853 A1 | 3/2011 | Ranford et al. |
| 2011/0087989 A1 | 4/2011 | McCann et al. |
| 2011/0125679 A1* | 5/2011 | Brdiczka ............... G06Q 10/10 |
| | | 706/12 |
| 2011/0130958 A1 | 6/2011 | Stahl et al. |
| 2012/0198383 A1* | 8/2012 | Cisler ................. G06F 9/4443 |
| | | 715/781 |
| 2012/0246596 A1* | 9/2012 | Ording .................. G06F 9/451 |
| | | 715/799 |
| 2013/0007028 A1 | 1/2013 | Alkov et al. |
| 2013/0104051 A1 | 4/2013 | Reeves et al. |
| 2013/0125002 A1* | 5/2013 | Spaeth ................ G06F 3/0482 |
| | | 715/731 |
| 2014/0019455 A1* | 1/2014 | Cochrane ............ G06F 9/4443 |
| | | 707/741 |
| 2014/0025712 A1 | 1/2014 | Chisa et al. |
| 2014/0101138 A1* | 4/2014 | Sugita ................ G06F 3/0482 |
| | | 707/722 |
| 2014/0243021 A1 | 8/2014 | Lerenc |
| 2014/0310623 A1* | 10/2014 | O'Connell, Jr. ..... G06F 17/3089 |
| | | 715/764 |
| 2014/0337322 A1* | 11/2014 | Cho .................... G06F 3/04817 |
| | | 707/722 |
| 2015/0193100 A1* | 7/2015 | Strode ................. G06F 3/0484 |
| | | 715/765 |
| 2015/0331604 A1* | 11/2015 | Tse ..................... G06F 3/04883 |
| | | 345/173 |
| 2015/0339307 A1* | 11/2015 | Hultgren ............. G06F 3/0481 |
| | | 707/724 |
| 2018/0121465 A1* | 5/2018 | Bajaj ..................... G06F 16/95 |

OTHER PUBLICATIONS

Office Action, dated Mar. 2, 2015, received in U.S. Appl. No. 14/081,945, 20 pages.

Final Office Action, dated Oct. 1, 2015, received in U.S. Appl. No. 14/081,945, 13 pages.

* cited by examiner

TIMELINE VIEW OF RECENTLY OPENED DOCUMENTS

BACKGROUND

On today's computers, files are in some circumstances accessible through file folder windows. That is, to open a desired file through an operating system, a user has to open a file folder window, then navigate the file system to find the desired file. Some systems also include application-specific ways to access files. For example, a user might use the "Open" command of a "File" menu within an application in order to open a similar file navigation window.

BRIEF SUMMARY

Some embodiments provide a graphical user interface (GUI) for an electronic device that displays recently opened files in a chronological arrangement. In some embodiments, the GUI is a primary GUI of an operating system for the electronic device (e.g., a desktop for a personal computer, a home screen on a tablet, smart phone, or other portable device, etc.). Upon receiving input requesting the display of recently-opened files, the device of some embodiments displays representations of the files in a chronological arrangement (e.g., based on the time that the files were most recently opened or closed).

In some embodiments, the files may pertain to multiple different applications that operate on the electronic device (e.g., the files may be word processing documents, spreadsheet documents, slide presentations, composite media presentations, images, video or audio files for playback, etc.). Some embodiments limit the files to editable documents of specific applications (e.g., office productivity applications, such as word processing, spreadsheet, etc.). In some embodiments, the applications that operate on the electronic device are represented in the primary GUI for the device by selectable items. When a user selects one of these selectable items with the recently-opened files displayed in the GUI, some embodiments highlight or focus on the files that relate to the selected application (e.g., the files editable by that application or which the application can open).

Some embodiments arrange the files in groups, or clusters, based on the time that he files were most recently open (e.g., the time that the files were most recently opened or closed). In some embodiments, files opened or closed within a threshold time of each other (e.g., one minute, five minutes, etc.) are grouped together. The groupings are visual, in that the representations of the files (e.g., a thumbnail for each file that shows a preview of the content of the file) in a group are displayed together along with a time that the files were most recently open.

In addition, in some embodiments, the groupings of files are functional. In response to a single selection input of a first group of files (e.g., a single selection input from a cursor controller or through a touchscreen), the electronic device opens all of the files in the first group so that the files in the first group are open concurrently, even when the files relate to multiple different applications. In some embodiments, the electronic device identifies a previous state of the GUI with all of these files open and restores the GUI to this previous state (e.g., displaying the documents in the same locations in the GUI as when the documents were closed). Similarly, in response to a single selection input of a second group of files, the electronic device opens all of the files in the second group so that the files in the second group are open concurrently.

The device of some embodiments animates the graphical representations of the files into the GUI. Upon receiving input requesting the display of the recently-opened files (e.g., receiving a particular keyboard shortcut, movement of a location indicator to a particular location in the GUI etc.), the device performs an animation to bring the graphical representations into the display. In some embodiments, the files are displayed as thumbnail previews on a shelf, which slides into the bottom of the display. In some embodiments, the representation of the shelf includes a selectable item that causes the device to animate the display of additional shelves with representations of additional recently open files.

In addition to displaying graphical representations of recently open files stored on the electronic device, some embodiments also include files stored on a network storage server (or set of servers), and accessed either on the electronic device or a different device associated with a same network storage account. That is, the user of the electronic device may associate the device with a network storage account that enables (i) storage of files on a set of servers accessible by the device as well as other devices also associated with the account and (ii) sharing of data between the various devices associated with the account. When files are accessed on any of the devices, whether those files are stored on the device itself or with the network storage account, some embodiments pass this data to the various devices for use in generating the display of recently opened files.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
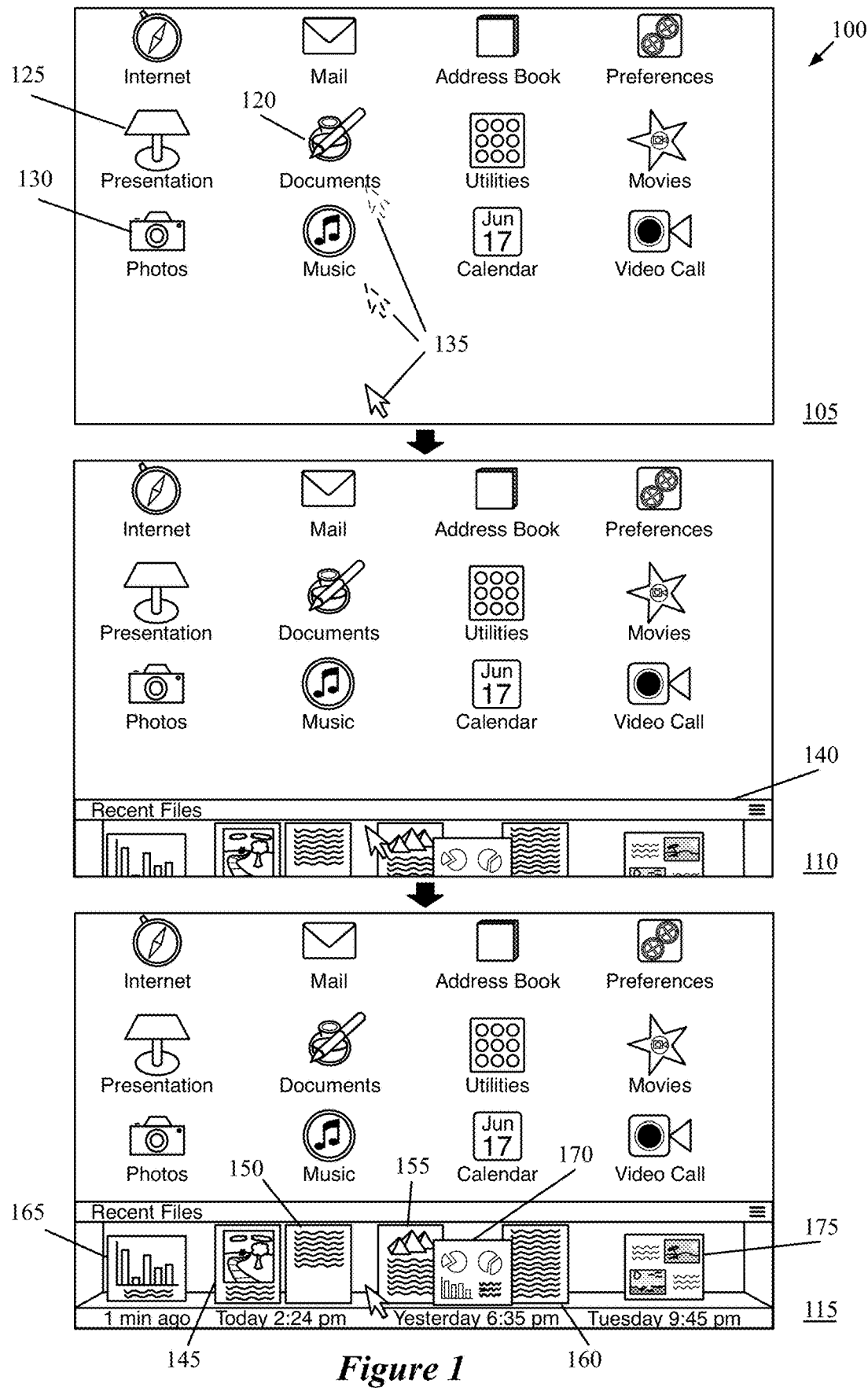
FIG. 1 illustrates a primary operating system GUI of some embodiments as the GUI receives user input to display the representations of recently open files and subsequently animates these representations into the display.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a graphical user interface (GUI) for an electronic device that displays recently opened files in a chronological arrangement. In some embodiments, the GUI is a primary GUI of an operating system for the electronic device (e.g., a desktop for a personal computer, a home screen on a tablet, smart phone, or other portable device, etc.). Upon receiving input requesting the display of recently-opened files, the device of some embodiments displays representations of the files in a chronological arrangement (e.g., based on the time that the files were most recently opened or closed).

In some embodiments, the files may pertain to multiple different applications that operate on the electronic device (e.g., the files may be word processing documents, spreadsheet documents, slide presentations, composite media presentations, images, video or audio files for playback, etc.). Some embodiments limit the files to editable documents of specific applications (e.g., office productivity applications, such as word processing, spreadsheet, etc.). In some embodiments, the applications that operate on the electronic device are represented in the primary GUI for the device by selectable items. When a user selects one of these selectable items with the recently-opened files displayed in the GUI, some embodiments highlight or focus on the files that relate to the selected application (e.g., the files editable by that application or which the application can open).

Some embodiments arrange the files in groups, or clusters, based on the time that he files were most recently open (e.g., the time that the files were most recently opened or closed). In some embodiments, files opened or closed within a threshold time of each other (e.g., one minute, five minutes, etc.) are grouped together. The groupings are visual, in that the representations of the files (e.g., a thumbnail for each file that shows a preview of the content of the file) in a group are displayed together along with a time that the files were most recently open.

In addition, in some embodiments, the groupings of files are functional. In response to a single selection input of a group of files (e.g., a single selection input from a cursor controller or through a touchscreen), the electronic device opens all of the files in the group, even when the files relate to multiple different applications. That is, a first group of files is selectable to initiate opening of several files in the first group so that the files in the first group are open concurrently, and a second group of files is selectable to initiate opening of several files in the second group so that the files in the second group are open concurrently. In some embodiments, for a selected group of files, the electronic device identifies a previous state of the GUI with all of the files in the selected group open and restores the GUI to this previous state (e.g., displaying the documents in the same locations in the GUI as when the documents were closed).

The device of some embodiments animates the graphical representations of the files into the GUI. Upon receiving input requesting the display of the recently-opened files (e.g., receiving a particular keyboard shortcut, movement of a location indicator to a particular location in the GUI etc.), the device performs an animation to bring the graphical representations into the display. In some embodiments, the files are displayed as thumbnail previews on a shelf, which slides into the bottom of the display. In some embodiments, the representation of the shelf includes a selectable item that causes the device to animate the display of additional shelves with representations of additional recently open files.

In addition to displaying graphical representations of recently open files stored on the electronic device, some embodiments also include files stored on a network storage server (or set of servers), and accessed either on the electronic device or a different device associated with a same network storage account. That is, the user of the electronic device may associate the device with a network storage account that enables (i) storage of files on a set of servers accessible by the device as well as other devices also associated with the account and (ii) sharing of data between the various devices associated with the account. When files are accessed on any of the devices, whether those files are stored on the device itself or with the network storage account, some embodiments pass this data to the various devices for use in generating the display of recently opened files.

The above paragraphs describe the recently open files display of some embodiments. Several more detailed examples are described below. Section I introduces examples of the recently open files display of some embodiments and its associated features. Section II then describes the incorporation of files accessed on other related devices into the recently open files display, while Section III describes various alternative or additional recent files displays. Finally, Section IV describes electronic systems with which some embodiments of the invention are implemented.

I. GUI Displaying Recently Opened Files

As mentioned, the graphical user interface (GUI) of some embodiments provides a feature that displays chronologically arranged graphical representations of recently opened files. While displaying a primary GUI for the operating system of an electronic device, the device receives input to display the recently open files in the GUI. In response, the device displays these files arranged in chronological order.

FIG. 1 illustrates such a primary operating system GUI 100 of a device of some embodiments over three stages 105-115 as the device receives user input through the GUI to display the representations of recently open files and subsequently animates these representations into the display. Specifically, the figure includes a first stage 105 in which the user provides input to cause the device to display representations of recently open files, and two stages 110 and 115 in which the device animates the representations of these files into the display.

As shown, the first stage 105 illustrates the primary operating system GUI 100. In this and subsequent examples, the GUI 100 is a personal computer desktop GUI (e.g., that would typically be displayed on a desktop or laptop monitor). However, the features illustrated herein would apply equally to other types of primary operating system GUIs, such as the home screen of a smart phone, tablet, or other mobile electronic device. Instead of the non-touchscreen interactions (e.g., cursor controller movement and selection input) shown in these figures, such embodiments would accept touchscreen input to create similar changes in the GUI.

The primary operating system GUI 100 of some embodiments includes selectable items for opening various applications on the electronic device that generates the GUI 100 (e.g., the desktop or laptop computer, smart phone, tablet, etc.). Selection of one of these items when the GUI is in the state shown in the first stage 105 causes the device to open the corresponding application (e.g., by opening an application window in the GUI). These selectable items include, for example, the item 120 corresponding a word processing application, the item 125 corresponding to a slideshow presentation application, the item 130 corresponding to a photo library application, etc. In some embodiments, various documents or files accessed on the electronic device (e.g., stored on the electronic device or on an external or network storage accessible by the electronic device) are associated with the different applications represented by these selectable items. That is, photos may be associated with the application corresponding to the selectable item 130, word processing documents associated with the application corresponding to the selectable item 120, etc.

In some embodiments, different locations in the primary operating system GUI 100 are associated with different functionalities. For a desktop or laptop GUI, moving a location indicator (e.g., a cursor) to a particular location may cause the electronic device to activate a particular feature in the GUI. Similarly, performing a gesture or tapping a touchscreen in a particular location may cause the touchscreen device to activate a particular feature. For example, moving the location indicator to a particular side or corner of the GUI might cause the operating system to display selectable items for one or more desktop spaces (e.g., separate desktops that the user may utilize to organize various different open projects, applications, etc.). In the case of the GUI 100, moving the location indicator to the bottom of the GUI causes the electronic device to display a graphical representation of the most recently open items. As shown, in this stage 105, user input (e.g., through a cursor controller) causes a location indicator 135 to move from a position at the center of the GUI to a position near the bottom edge of the GUI 100.

The second and third stages 110 and 115 illustrate the result of this user input. Specifically, in these stages, as a result of the movement of the location indicator, the electronic device displays the animation of a graphical representation of most recently open items into the GUI 100. One of ordinary skill in the art will recognize that (i) other mechanisms for incorporating the graphical representations into the display may be used in different embodiments (e.g., different animations, no animation, etc.) and (ii) the graphical representation may be activated by any other type of user input in different embodiments.

The second stage 110 illustrates that a recent files display 140 has begun to move upwards into the GUI 100. This movement continues into the third stage 115, which shows the GUI 100 after the recent files display 140 has been fully animated into the GUI. As shown in this third stage 115, the recent files display 140 of some embodiments includes thumbnail images of various recently open files. The thumbnails include previews of word processing documents, such as thumbnail previews 145-160 and slideshow presentations 165-175. If other types of files (e.g., image files, video files, e-mails, address book contacts, etc.) had been open recently on the electronic device, these files would be included as well in some embodiments. In other embodiments, only a subset of file types are displayed in the recent files representation (e.g., only editable documents, or only files associated with certain applications).

In the examples shown herein, the graphical representations of files are displayed on graphical shelves. These may have the appearance of glass shelves, wooden bookshelves, etc. Though not shown in these figures, some embodiments include shadows or reflections of the representations on the graphical shelves to simulate a light source from above, as well as other graphical features to improve the appearance.

These graphical thumbnail representations 145-175 of the files are arranged in time order, starting with the most recently open. In some embodiments, the files are arranged in order based on when the file was most recently selected for opening. In other embodiments, the device arranges the files in the GUI based on when the file was most recently open on the electronic device (e.g., the time at which the file was most recently closed).

In this example, the device also groups the files in clusters by time in the GUI 100. Thus, in the example, the recently open files include one file that was most recently open 1 minute ago, two files most recently open at 2:24 PM on the same day, three files most recently open the previous day at 6:35 PM, and one more file most recently open several days prior (Tuesday) at 9:45 PM. Users will often have related files open at the same time. For instance, a user might have both the specification and drawings for a patent application open together, or several documents and/or slideshows for use in a presentation. The user will often open these files at around the same time and subsequently close the files at the same time. By clustering the files by the time most recently open, the device often presents related files as grouped together visually. As described below, in some embodiments, a user can select one of the groups in order to open all of the files in a group at the same time.

In some cases, however, the user will close one file at a particular time, then close another file a minute or two later. Different embodiments may use different techniques to determine whether two (or more) files should be grouped as a cluster for the recent files display. Some embodiments require that the files be closed (or opened, depending on how the recency is determined) within the same minute according to the device clock. Other embodiments require that the files be closed (or opened) within a particular duration of each other (e.g., thirty seconds, one minute, five minutes, etc.). For clusters with potentially more than two files, some such embodiments impose the duration requirement from the time the first file is closed (or opened) and only include files in the cluster if the files are opened (closed) within the imposed duration of that first file. Other such embodiments, however, reset the duration each time another file is close. For example, if the duration is one minute, and a first file is closed at 6:35:00 (time in hours:minutes:seconds), a second file is closed at 6:35:45, and a third file is closed at 6:36:30, then this third file would only be included in the same cluster as the first file using the second condition. Still other embodiments may look at other factors to determine relationships between files, such as whether the user was switching back and forth between the files while the files were open. To determine the displayed time (e.g., "Today 2:24 pm") for files closed (or opened) over the course of several minutes, different embodiments may use an average time that the files were closed, the time the first file was closed, the time the last file was closed, etc.).

Figure 2:
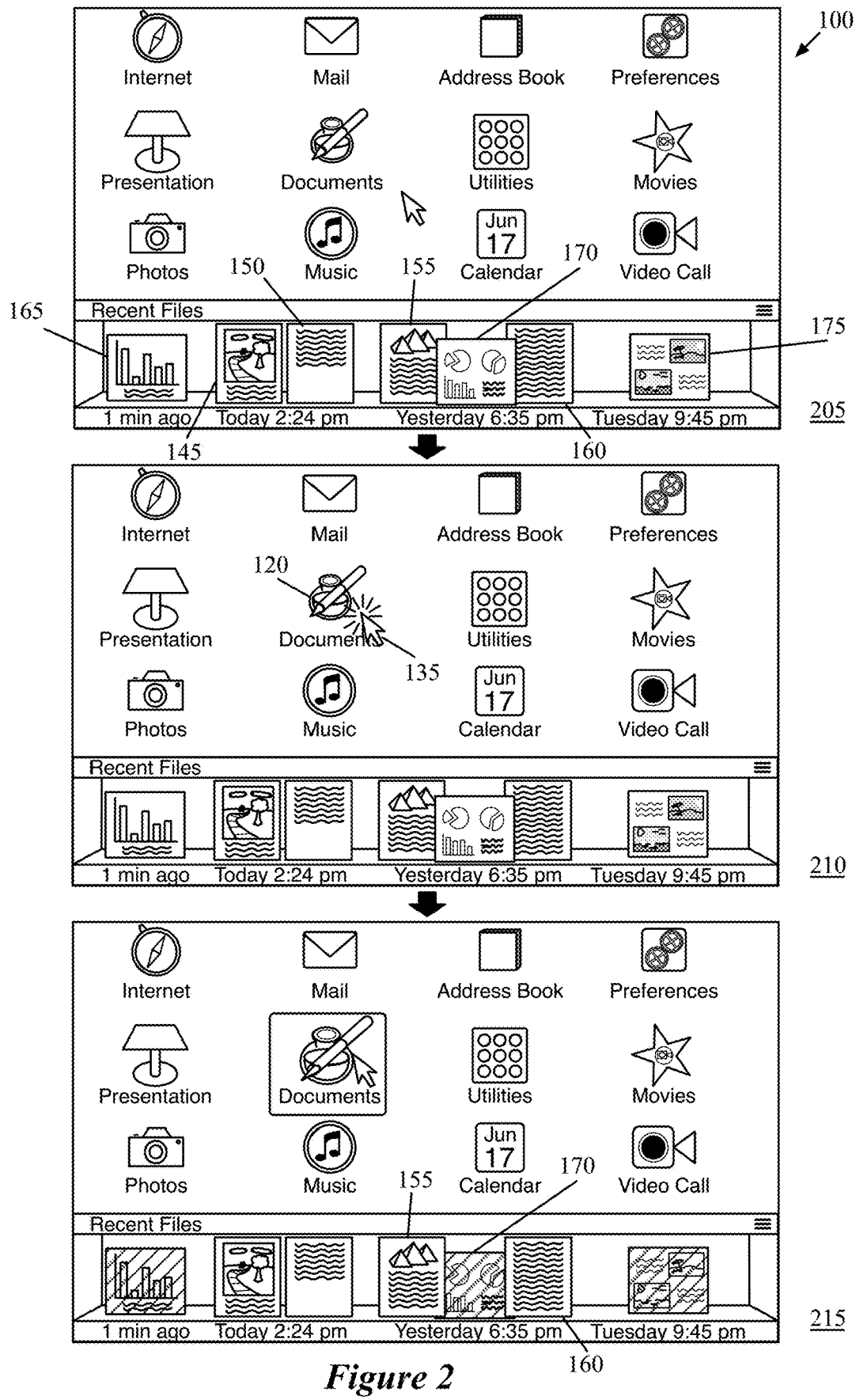
FIGS. 2 and 3 illustrate the GUI highlighting recent files associated with different applications based on user selections of the applications.

In addition, some embodiments allow the user to highlight files associated with a particular application (e.g., of a particular type or file extension). FIG. 2 illustrates the device highlighting recent files associated with a particular application based on a user selection of the application, over three stages 205-215 of the GUI 100. The first stage 205 illustrates the GUI 100 in the same state as the third stage 115 of FIG. 1, with the graphical representations 145-175 of recent files shown at the bottom of the GUI. In the second stage 210, the user moves the location indicator 135 to the selectable item 120 representing a word processing application, and selects the item 120 (e.g., using a cursor controller).

The third stage 215 illustrates the result of this action in the GUI 100. Specifically, the graphical representations 145-160 of recent documents associated with the word processing application are highlighted. In some embodiments, as shown, the graphical representations of the selected application are highlighted, not by changing their representations, but by applying an effect to the representations of other files not associated with the selected application. In this example, the GUI partially fades out the graphical representations 165-175, so that the representations 145-160 of word processing documents are displayed more prominently. The non-associated graphical representations may be blurred, faded out, lightened, etc. in various embodiments. Other embodiments leave the non-associated graphical representations the same, while accentuating the graphical representations of files associated with the selected application (e.g., by brightening the graphical representations, displaying a selection border around them or other additional graphical indicator, etc.).

In addition, with their respective clusters, the graphical representations 145-160 of files associated with the selected word processing application are brought to the front (i.e., in front of the non-associated file representations). Thus, in the cluster of files most recently open at 6:35 PM of the previous day, the graphical representation 170 for a slideshow is displayed behind the graphical representations 155 and 160 of word processing documents, in addition to being displayed as partially faded out.

Lastly, the selectable item (e.g., a graphical icon) for the word processing application is highlighted in the GUI 100 at this third stage 115 as well. As with the identified files, the selected application item may be highlighted differently. In this case, the area of the GUI associated with the item (e.g., a rectangle, rounded rectangle, circle, etc.) is indicated via a border. Other embodiments may brighten or darken either a similar area or the graphical icon for the application, or provide other indicators that the application item has been selected. In some embodiments, the GUI remains in this state until input is received to end the selection of the application (e.g., releasing a cursor controller button, selecting a new application or a portion of the GUI independent of any of the applications, etc.).

Figure 3:
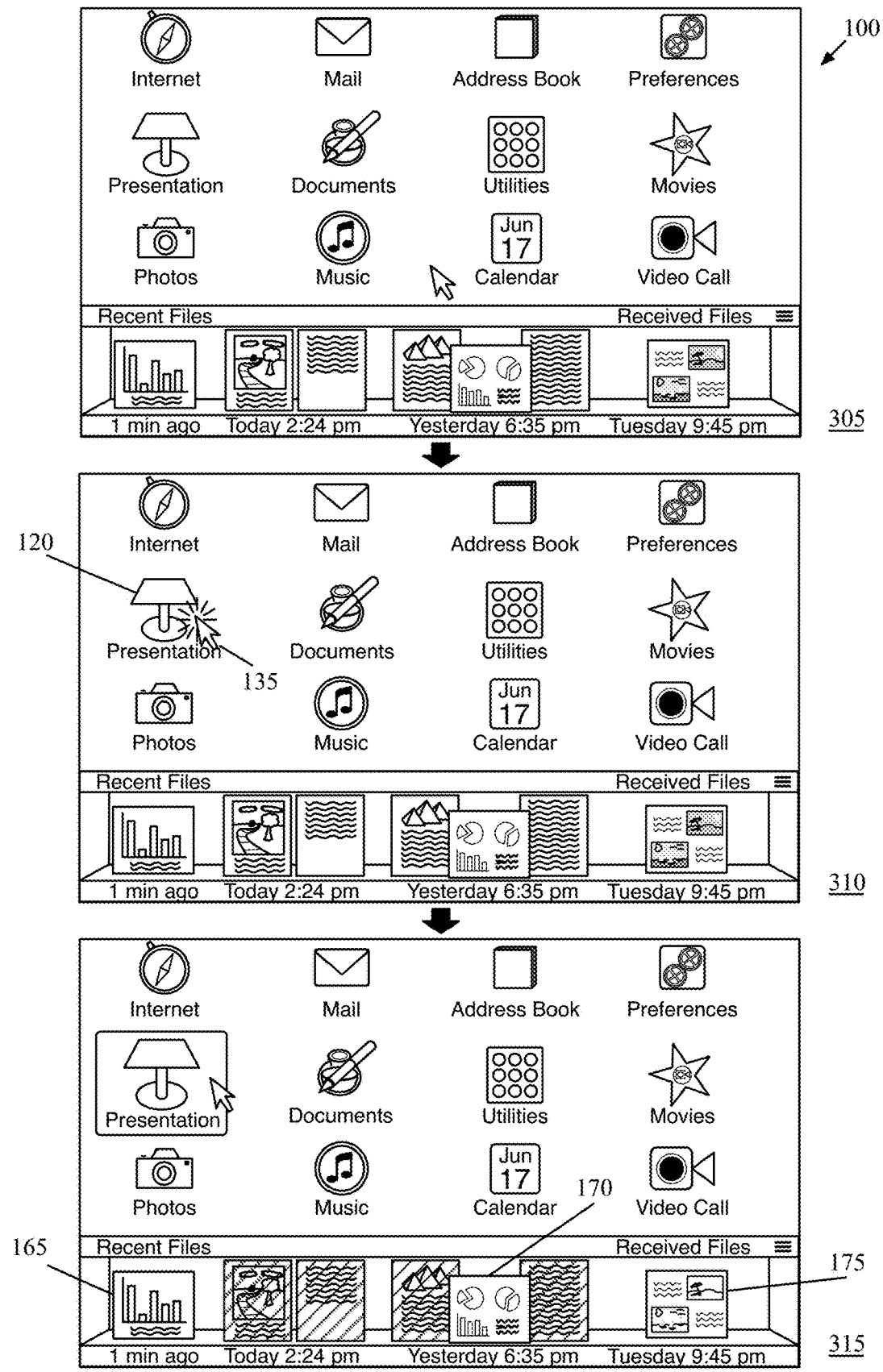

FIG. 3 illustrates a similar operation to that of FIG. 2 over three stages 305-315, with the selectable item 125 for a slideshow presentation application selected instead of a word processing application. The first two stages 305 and 310 illustrate the GUI 100 in the same states as the corresponding stages 205 and 210, except that in the second stage 310, the user moves the location indicator 135 to the selectable item 125, and selects this item for the slideshow presentation application.

The third stage 315 illustrates the result of the selection of the slideshow presentation application item 125 with the recent files display in the GUI 100. Specifically, in this case, the graphical representations 165-175 associated with the slideshow presentation application are highlighted, while the other graphical representations 145-160 are de-emphasized in the display, in a similar manner to that shown in FIG. 2.

Some embodiments enable a user to view additional recent files through the selection of a selectable item in a recent files display or other user input. For example, the examples shown illustrate one shelf displaying recently open files. However, the user might want view clusters of recently open files going back to earlier times, in order to identify or re-open a group of files for a project that the user was working on at an earlier date or time, but which do not appear in the most recent files shown initially.

Figure 4:
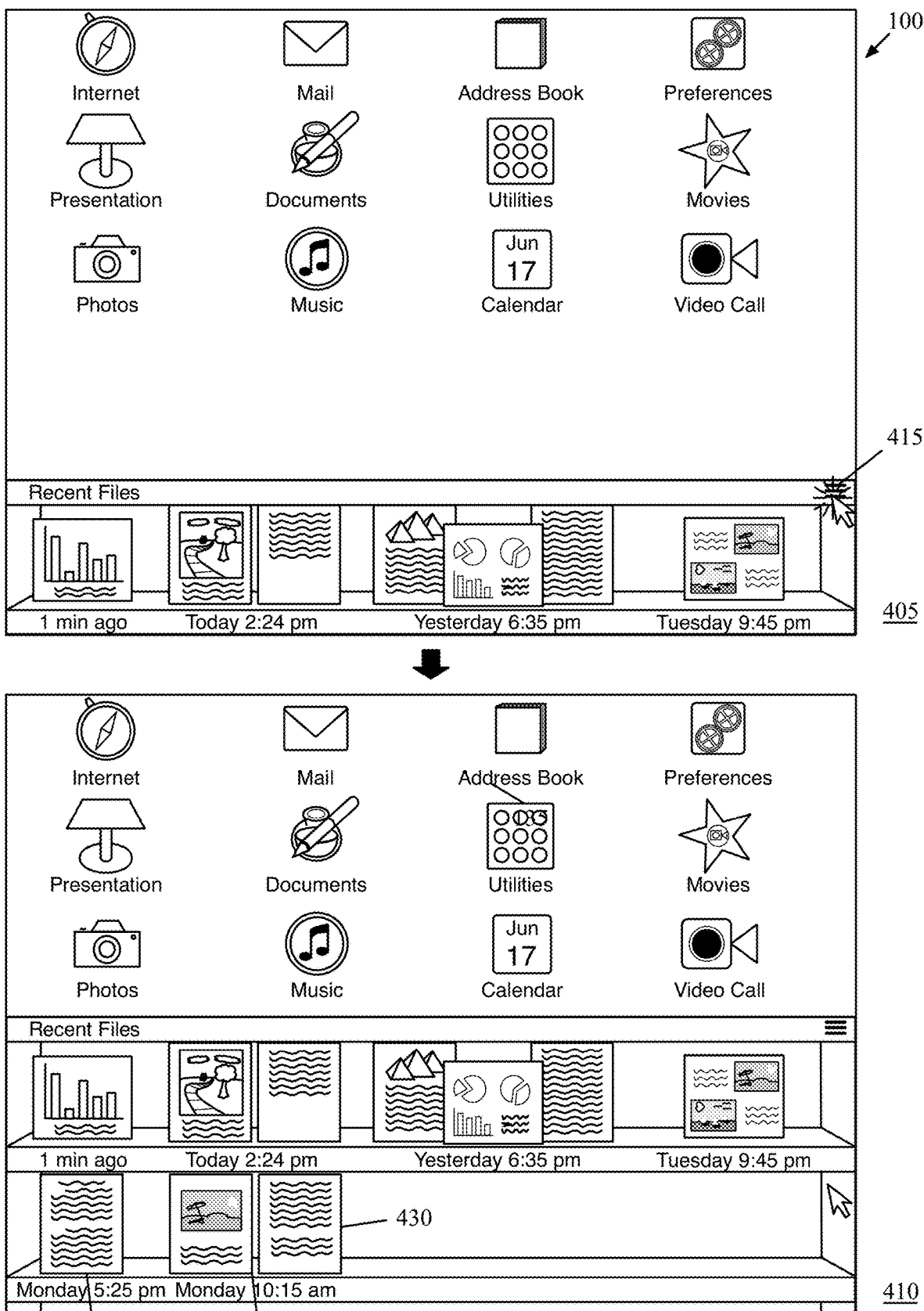
FIG. 4 illustrates the selection of such a selectable item that causes the GUI to display additional recently open files.

FIG. 4 illustrates the selection of such a selectable item that causes the device to display additional recently open files, over two stages 405-410 of the GUI 100. The first stage 405 illustrates the GUI 100 in the same stage as the third stage 315, with one graphical shelf displaying graphical representations of the most recently open files on the electronic device. In addition, at this stage 405, the user selects an item 415 in the GUI. This selectable item 415 is part of the recent files display.

In the resulting second stage 410, the device displays graphical representations 420-430 of additional recently open files on a second graphical shelf in the GUI. In some embodiments, just as the electronic device animated the display of the initial recent files display (as shown in FIG. 1), the device also animates the display of additional recent files, by sliding the entire display further upwards in the GUI, revealing one or more additional rows (e.g., shelves) of recently open files. In this case, because there are only three more files to display, only one additional shelf is displayed in the GUI. Some embodiments may display additional shelves, either automatically when additional documents were recently open within a particular timeframe (e.g., one week, ten days, two weeks, etc.) or in response to additional user input. For instance, in some embodiments, the user may provide input for a drag operation to move the shelves up or down in order to view more or fewer recently open files. In some embodiments, re-selecting the selectable item 415 causes the device to return to displaying only the initial set of recent files in the GUI (e.g., only one graphical shelf).

Figure 5:
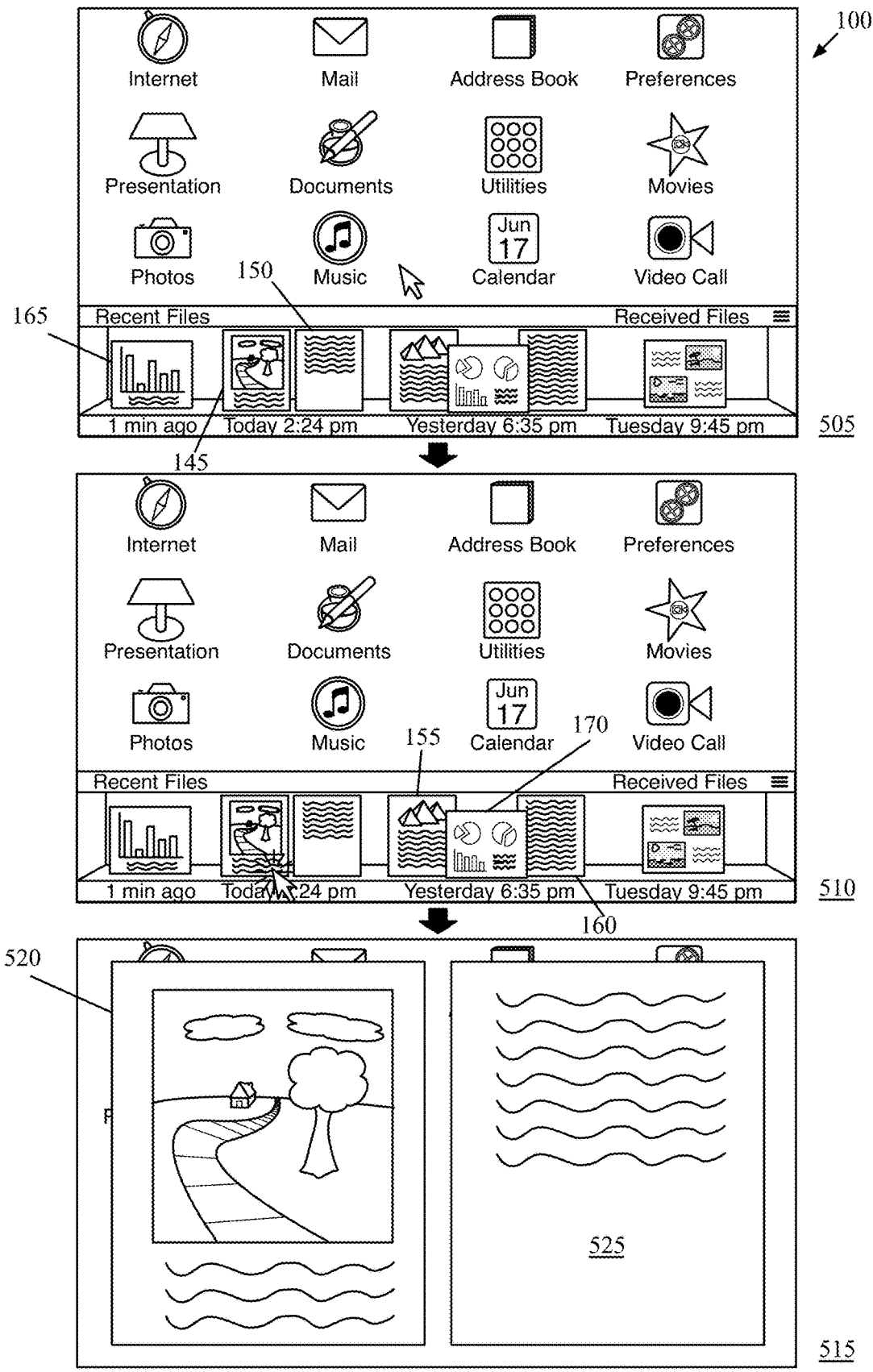
FIG. 5 illustrates a user selecting the graphical representation for a time-associated cluster of files and the subsequent opening of these files in the GUI.

As mentioned briefly above, in some embodiments, the user can select one of the clusters of recently open files associated with a particular past time in order to re-open these files. FIG. 5 illustrates a user selecting the graphical representation for a time-associated cluster of files and the subsequent opening of these files in the GUI 100 over three stages 505-515. The first stage 505, again, is the same as the third stage 115 of FIG. 1, with the graphical representations 145-170 of recently open files displayed in the GUI. These graphical representations are grouped into several time-associated clusters, with the first cluster only having the graphical representation 165 for a single slideshow presentation, the second cluster having the graphical representations 145 and 150 for two word-processing documents, etc.

In the second stage 510, the user selects the second of these clusters (with the graphical representations 145 and 150) by, e.g., moving a location indicator over the set of thumbnail graphical representations and providing a selection input. In some embodiments, by providing different selection inputs, users can select either a specific single file (e.g., with a single-mouse click over the graphical representation of the file) or all of the files in a cluster of files (e.g., with a double-click over any of the graphical representations in a cluster or a single-click combined with holding down a key on a keyboard).

The third stage 515 illustrates the result of this selection of the cluster of files. Specifically, the device now displays two word processing document windows 520 and 525 in the GUI 100. In some embodiments, the electronic device displays each of the files in a selected cluster at their last location in the GUI prior to the closing of the documents. That is, when the user closes the documents, the electronic device (e.g., the operating system of the device) stores state information for the file, indicating its last location in the GUI. The electronic device then uses this state information to return the window opened for the file to its previous location. Some embodiments also store state information for the cluster as a whole. For instance, if several windows are open for different files, the windows might have a depth order in the GUI (i.e., an order in which the windows are presented from back to front). Upon selection of the cluster, in some embodiments the electronic device restores the set of windows to their previous state both in terms of location and depth-ordering. In addition, some embodiments use this state information to generate the display of the clustered graphical representations of the files in the recently open files display. The third cluster of graphical representations 155, 160, and 170, in some embodiments, is a preview representation not just of the content of the represented files, but also of the state of the GUI for that cluster of files, with the window for the slideshow presentation file represented as in front of the two word processing files.

Some embodiments animate the transition from the second stage 510 to the third stage 515. For example, some embodiments animate the expansion of the graphical representations of the files into the windows for the files (e.g., the expansion of graphical representations 145 and 150 into the windows 520 and 525). As these file representations expand, some embodiments also animate the removal of the recent files display from the GUI (e.g., by sliding the display off of the GUI). Though not shown in the third stage 515 of FIG. 5, upon opening the windows for selected files, some embodiments also display selectable application menus (e.g., across the top of the GUI), close controls on the opened windows, etc.

Figure 6:
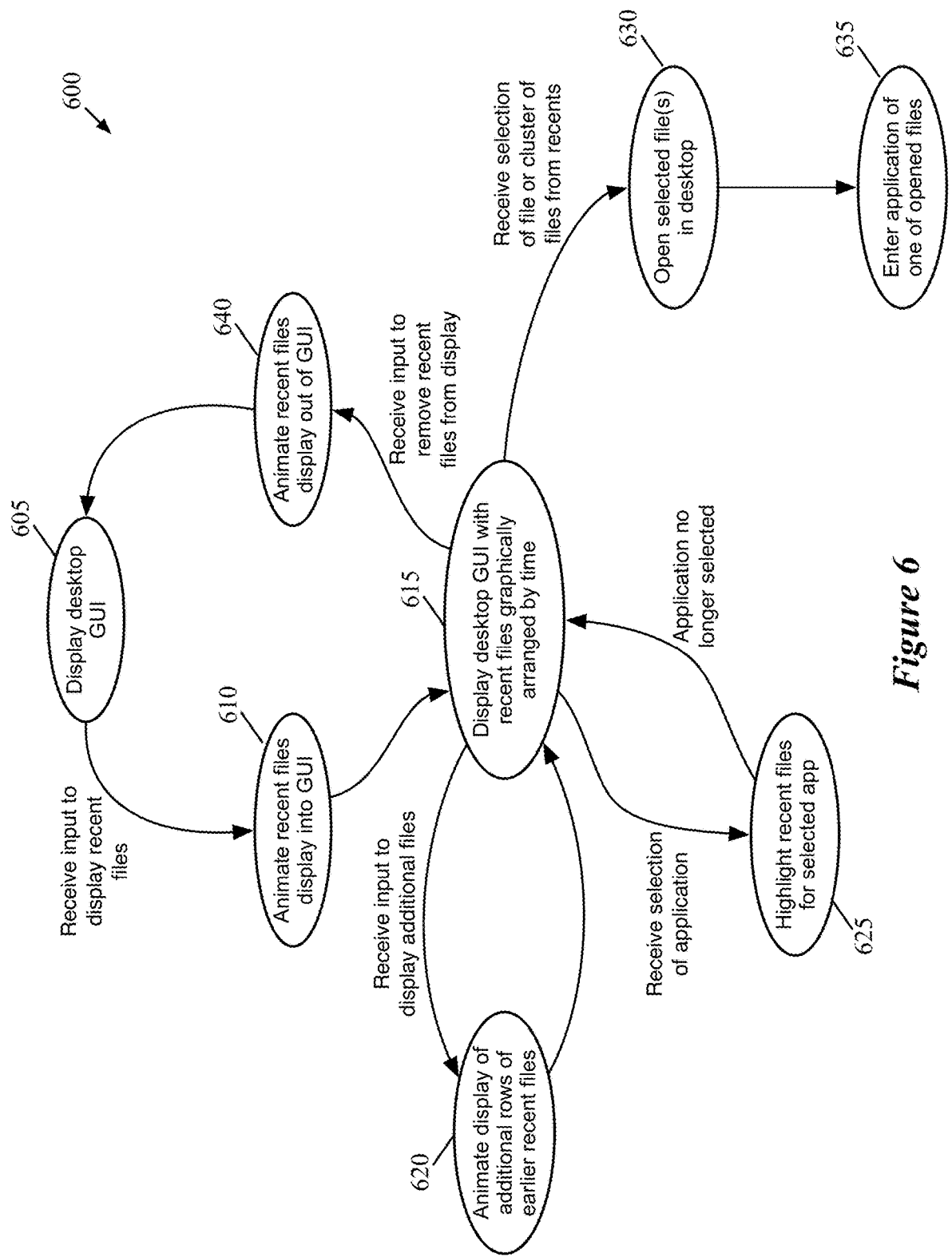
FIG. 6 conceptually illustrates a state diagram that shows states and changes between states for the GUI of some embodiments.

FIG. 6 conceptually illustrates a state diagram 600 that shows states and changes between states for the GUI of some embodiments (e.g., a primary operating system GUI such as the desktop GUI 100). In each of the states shown in this diagram, the operations of the operating system (or other controlling application on the electronic device) are controlled by one or more processes responsible for the user interaction with the GUI. One of ordinary skill in the art will recognize that this state diagram 600 does not cover every possible interaction with the GUI, but instead specifically focuses on the operations involving the recently open files display. For instance, the state diagram does not describe the selection of application items without the recently open files display in order to open the application, or any of a wide variety of other actions available for such a GUI. In addition, while the state diagram 600 refers specifically to a desktop GUI such as that shown in FIGS. 1-5, one of ordinary skill in the art will recognize that the states and transitions therebetween are equally applicable to other GUIs (e.g., home screen GUIs for smart phone or tablet devices).

As shown by the state diagram 600, when the desktop GUI has not received any input to display the recently open files, the GUI operates in the state 605, in which it is displayed statically. From this state, the user could open applications by selecting items representing those applications, view desktop spaces, rearrange GUI items, or perform other standard GUI actions.

Upon receiving user input to display recently open files, the device transitions the GUI to state 610 to animate the recently open files display into the GUI. Upon completion of the animation, the device transitions the GUI to the state 615, in which the device statically displays the desktop GUI with graphical representations of the most recently open files arranged by time. An example of this animation and resulting display is shown in the second and third stages 110 and 115 of FIG. 1, although various different animations are possible (or no animation of the recently open files display). The user input that causes the display of the graphical representation may, in various embodiments, entail a selection of a particular GUI item from a menu, a movement of a location indicator to a particular location in the GUI, selection input (e.g., a tap on a touchscreen or touchpad, a mouse click, etc.) at a particular location in the GUI, etc.

Some embodiments display the recently open files in the manner shown in FIG. 1, with thumbnail-type previews of the files. For files that do not have a visualization (e.g., audio-only media files), some embodiments display an application icon representing the application that would open the file, or other graphical representation for the files. As mentioned, some embodiments arrange the graphical representations of the files in chronological order using the time the file was most recently closed (or opened), and group these files into clusters. In some embodiments, the graphical representations are displayed in rows (e.g., on graphical shelves), though various other sorts of display are possible as well.

With the GUI in state 615, various user interactions with the recently open files display are possible. In some embodiments, a limited number of recently open files are initially represented, and the user can provide input to display additional files. In response to this input, the device transitions the GUI to the state 620 to animate the display of additional representations of files into the GUI. An example of such input and the subsequent display of additional graphical representation of recently open files is shown in FIG. 4 (via the selection of a selectable item provided as part of the recently open files display). After animating the display of graphical representations of additional files, the device transitions the GUI back to the static state 615, at which the initial file representations as well as the new file representations are displayed.

With the GUI in state 615, if an application is selected (e.g., through a selectable item representing the application), the device transitions the GUI to state 625 to highlight the recently open files associated with the selected application. This may entail applying a visual effect to all of the representations of files associated with the selected application (e.g., displaying a border around the representations, brightening them, bringing the representations to the front of their respective clusters, etc.) or applying a visual effect to all of the representations not associated with the selected application (e.g., blurring the representations, fading them out, moving the representations to the back of their respective clusters, etc.) as shown in FIGS. 2 and 3. When the user removes the selection of the application (e.g., by selecting elsewhere in the GUI, ending a press-and-hold selection of an item representing the application, etc.), the device transitions the GUI back to 615 again.

Finally, if the device receives a selection of one of the recently open files or a cluster of recently open files through the GUI, the device transitions the GUI to state 630 to open the selected file or files in the desktop. As shown in FIG. 5, some embodiments allow the user to select a cluster of files corresponding to a particular time when the files were closed (or opened) together, causing the device to display all of the files in the cluster. Some embodiments, as described above, restore the state of the GUI at the time that the files were closed, including the position and depth-ordering of the windows for each of the files. Upon opening the files, the device transitions the GUI to state 635 to enter the application for one of the opened files (i.e., the application responsible for opening files of that file type). In some embodiments, the top file in the depth-ordering is the file window that is initially active, and whose associated application is also active.

The user might also provided input to remove the recently open files display from the GUI without opening any of the files. In this case, if such input is received while in the state 615, the device transitions the GUI to 640 to animate the recently open files display out of the GUI. In some embodiments, this animation is the reverse of the animation from state 610 (e.g., with the display sliding off of the GUI rather than onto the GUI).

II. Incorporating Files Accessed on Other Devices

In some embodiments, users may utilize several different devices linked to a single account, and wish to access the same file on more than one of these devices. For instance, a user may have a cloud storage account that is accessed by her laptop computer, tablet, and smart phone (or other collection of devices). The user can store files on a centralized network server or set of servers (e.g., in a datacenter), and the files are associated with an account name. The user then associates her devices with this account name, and all such devices can access the files on the set of servers, as well as the files stored on the respective devices.

The recent files display, in some embodiments, incorporates such files accessed on other devices—both files stored in the network storage and files stored on the other devices. For example, a user might access a network document on her smart phone or tablet, and subsequently want to continue editing the document on her laptop shortly thereafter. A user might also be editing a slideshow presentation on her desktop at home, but then travel to a library or coffee shop and want to continue working on the slideshow from her laptop. In some embodiments, the recent files display identifies not only the time at which a document was last open, but also the device used to access the document.

Figure 7A:
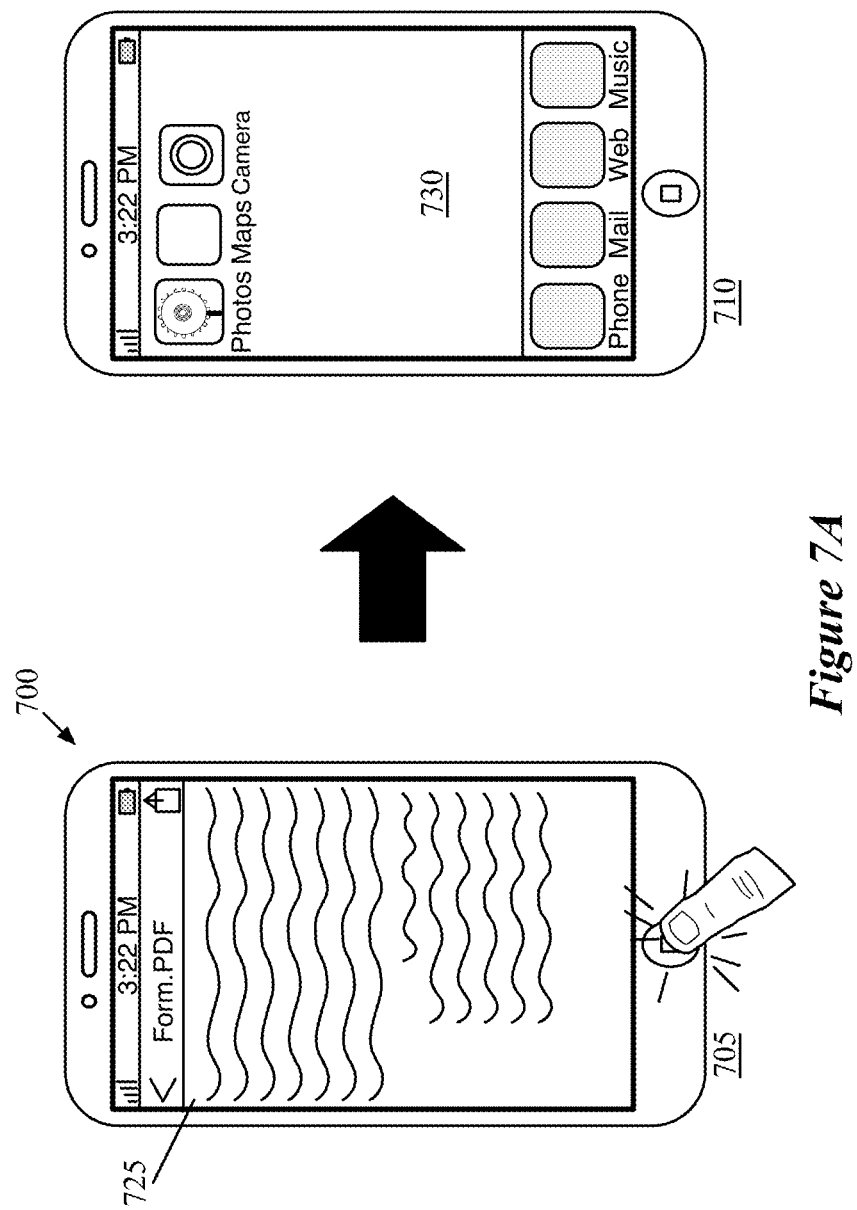
FIG. 7A-B illustrate the access of a document on a user's mobile device and then the subsequent display of a graphical preview of that document in the recent files display on a different device.
Figure 7B:
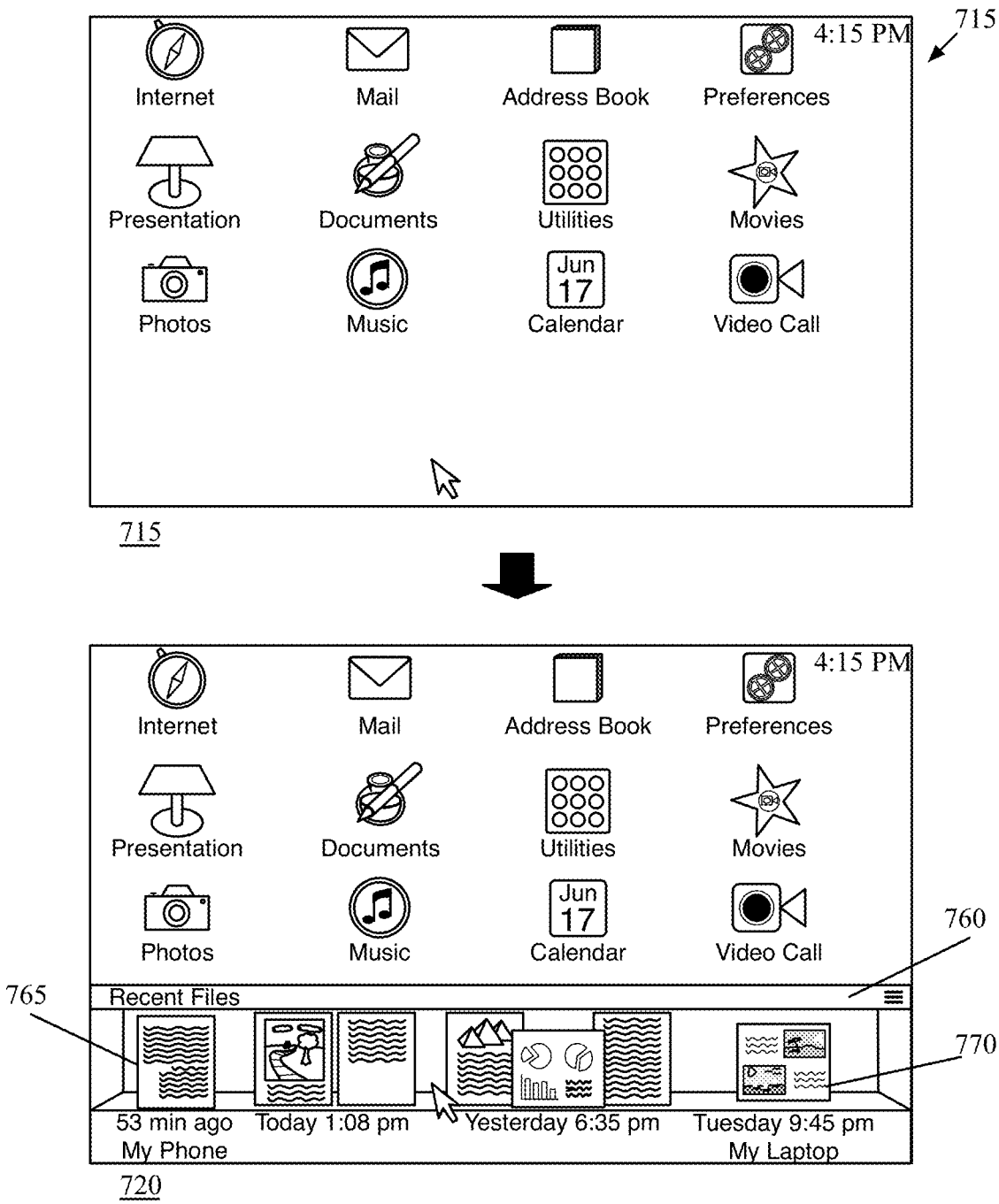

FIG. 7A-B illustrates the access of a document on a user's smart phone and then the subsequent display of a graphical preview of that document in the recent files display on a different device (e.g., a laptop). Specifically, FIG. 7A includes two stages 705-710 illustrating the use of a smart phone and FIG. 7B includes two stages 715-720 illustrating the subsequent use of a laptop or desktop computer.

In the first stage 705, the user is accessing a document 725 ("Form.PDF") on a mobile device 700 (e.g., a smart phone). The mobile device 700 accesses a network storage (by connecting through a wireless network, such as a cellular-type network or a Wi-Fi network) using an account name and credentials associated with a user of the device. The document 725 might be stored on the mobile device 700, or stored on the network storage account and retrieved by the mobile device 700. As shown in the first stage, the current time is 3:22 PM, and at this time the user provides input to return to a home screen of the smart phone, thereby effectively closing the document.

The second stage 710 illustrates this home screen 730, which includes various selectable items corresponding to different applications available on the mobile device 700. The user may view documents stored on the device or on the network storage using one or more of these applications. In some embodiments, the home screen 730 provides a recent files display similar to that shown in FIG. 1 above, in response to specific user input (e.g., a particular gestural touch input).

As mentioned, the third and fourth stages 715-720 of FIG. 7B illustrate a GUI 750 of a different electronic device, such as a laptop or desktop computer. The GUI 750 is similar to the GUI 100 shown in the previous Section I. The third stage 715 illustrates that the current time is 4:15 PM, and the user has moved a location indicator 755 to the bottom of the GUI in order to activate a chronologically-arranged set of graphical representations of recently open files.

The fourth stage illustrates such a recent files display 760. In this case, the recent files display includes graphical representations of files opened on any of the user's devices, rather than just on the electronic device generating the display. Thus, the leftmost file representation 765 is a preview of the file 725 that had been open on the user's smart phone previously. In this example, the recent files display indicates not only the time that this file was last open (53 minutes ago, or 3:22 pm) but additionally the name of the device on which the file was open. In this example, the user has named their smart phone "My Phone", which is displayed below the last open time. For the subsequent representations, the files were open on the computer displaying the GUI 750, so no additional information is presented. However, the last graphical file representation 770 is a file that was open on a third device, named "My Laptop" by the user.

In some embodiments, the electronic device that presents the recent files display is attached to a network and either requests recently open file data or receives push updates of this data from the network storage. The network storage, in some embodiments, stores data regarding activities being performed on the user's different devices (e.g., videos being streamed, etc.) and enables the user to continue these activities when switching devices. Similarly, the network storage stores data regarding files opened on different devices, enabling the recent files display on one device to indicate files opened on the other devices. When those files are on the network storage (as opposed to stored on the other devices themselves), then the user can select a graphical representation of such a file in order to open the file on the new device.

In some embodiments, the graphical representations of files not stored on the device (e.g., the representation 770) are generated at the network storage server and pushed down to the device for use in the recently open files display. When the user selects such a representation in order to open a file, the device requests the file from the network storage. In other embodiments, the network storage server pushes down the file automatically, and the operating system of the device generates the graphical representation of that file for display.

In addition, the recently open files on the other devices (e.g., the laptop on which the slideshow presentation to which the graphical representation 770 corresponds) might not be stored on the network storage servers. Instead, the devices might push file data regarding the recently accessed files (including graphical representations of the files) to the network storage, which then either pushes this data to other devices or sends the data in response to requests. When a user selects a file representation for a file stored on another device, in some embodiments the network storage servers act as a central hub to receive the request for the file, then subsequently request the file from the original device and pass the file down to the requesting device. In yet other cases, the files might be pushed to the network server with the recently open file data, but only stored on the servers for a temporary duration (e.g., the duration during which the files would appear on the recently open files displays of other devices that access the network storage account).

Figure 8:
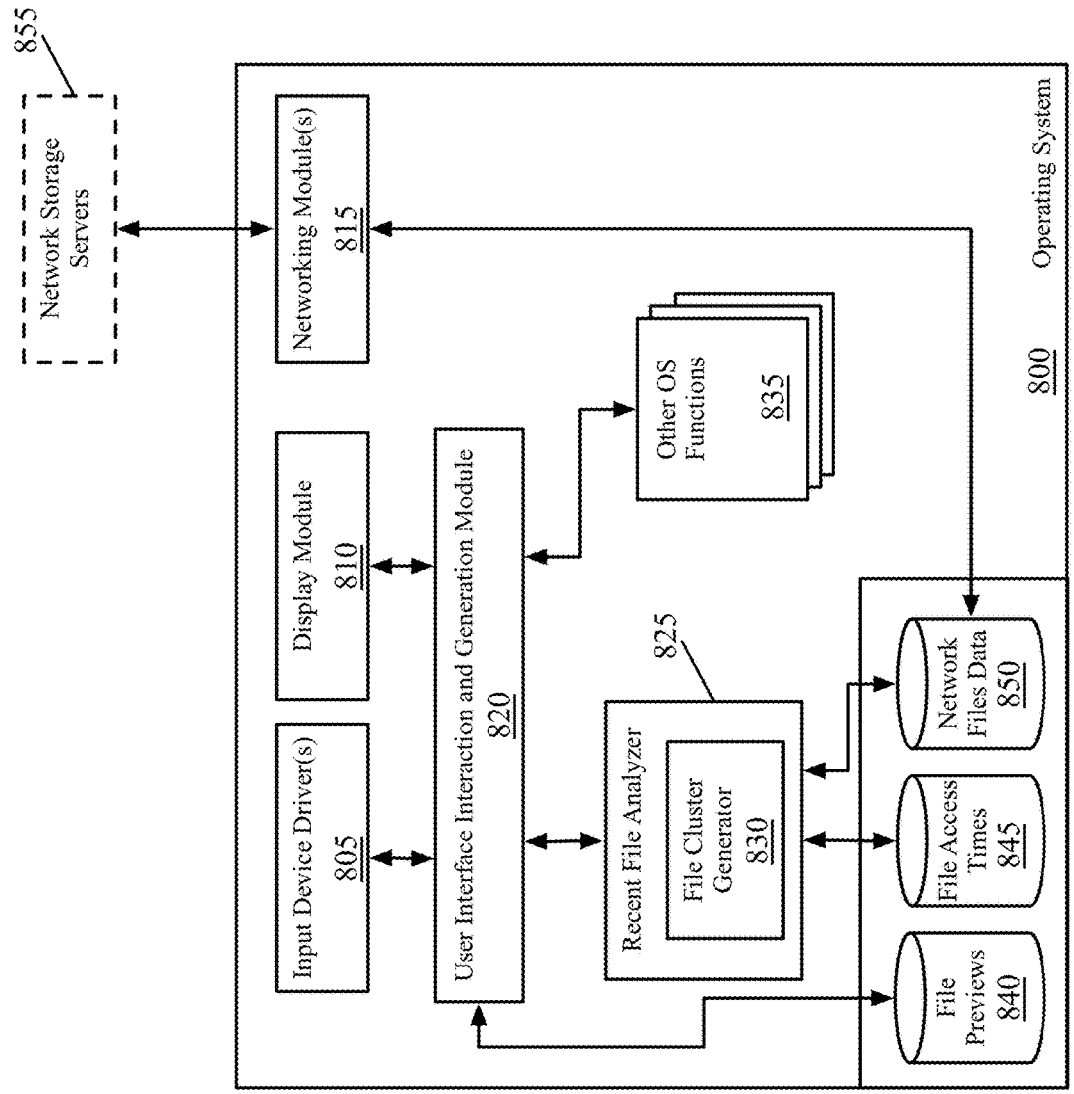
FIG. 8 conceptually illustrates the software architecture of an operating system of some embodiments.

In some embodiments, the processes described above are implemented as software running on a particular machine, such as a laptop computer, desktop computer, mobile device, etc., or stored in a machine-readable medium. FIG. 8 conceptually illustrates the software architecture of an operating system 800 of some embodiments. Though shown as part of the operating system, in some embodiments the recent files display functionality may be part of an application built upon the operating system.

The operating system 800 includes input device driver(s) 805, a display module 810, network module(s) 815, a user interface interaction and generation module 820, a recent file analyzer 825 that includes a file cluster generator 830, and other operating system functions 835.

The operating system 800 also stores data associated with recently open files (in addition to the actual files, at least some of which may be stored in the device's file system). This data includes file previews 840, file access time data 845, and network files data 850. The file previews 840 stores the graphical representations of files for use in the recent files display. These graphical representations may be miniaturized versions of the first page (or slide, etc.) of a file, the most recently viewed or edited page (or slide, etc.), etc. Though shown as being stored previews here, some embodiments generate the previews on the fly when the request to display the recent files display is received. The file access times 845 stores data regarding the recently accessed files. In some embodiments, this data is stored for all files stored on the file system (e.g., some systems store both last edit times and last access times for all files). The file access times 845 are used by the recent file analyzer to generate the recent files display. The network files data 850 stores information about recently accessed network files in some embodiments. For instance, the network files data 850 might receive updates from a network storage server regarding recently viewed or edited files stored on the network storage server for an account with which the device running the operating system 800 is associated.

In some embodiments, the three sets of data (as well as other operating system-related data) are stored in one physical storage (e.g., an internal hard drive, external hard drive, solid state memory, volatile storage such as random access memory, etc.). In some embodiments, the data may be split between multiple physical storages. For instance, the file access times 845 might be stored on a hard drive, while the file previews are generated and stored temporarily in RAM.

The input device drivers 805 may include drivers for translating signals from a keyboard, mouse, touchpad, trackpad, graphics tablet, touchscreen, etc. A user interacts with one or more of these input devices, which send signals to their corresponding device driver. The device driver then translates the signals into user input data that is provided to the UI interaction and generation module 820.

The display module 810 translates the output of a user interface for a display device. That is, the display module 810 receives signals (e.g., from the UI interaction and generation module 820) describing what should be displayed and translates these signals into pixel information to be sent to the display device. The display device may be a LCD, plasma screen, CRT monitor, touchscreen, etc.

The user interface interaction and generation module 820 interprets the user input data received from the input device drivers 805 and passes it to various operating system modules, including the recent file analyzer 825. The UI interaction and generation module 820 also manages the display of operating system features, such as the selectable items representing applications, the recently open files display, and other operating system graphics. For instance, the recent file analyzer 825 of some embodiments identifies the representations that should be displayed in a recently open files display, which is generated by the UI interaction and generation module 820 according to these specifications. In addition, the module 820 may generate portions of the UI based solely on user input—e.g., when a user moves an item in the UI that only affects the display rather than involving any of the other modules, such as modifying the locations of the selectable application items.

The recent file analyzer 825 handles the determination as to which files should be graphically represented in a recent files display. When user input is received by the operating system that corresponds to a request for the recently open files, the UI interaction and generation module 820 forwards the request to the recent files analyzer 825. The recent files analyzer uses the file access times 845 and, in some embodiments, the network files data 850 to identify the files that should be graphically represented in the UI.

The recent file analyzer 825 includes a file cluster generator 830. The file cluster generator 830, in some embodiments, includes the logic for determining which groups of files should be grouped together in the recently open files display. As described above, the cluster generator 830 may look at the duration between closing (or opening) one file and the next (or groups of more than two files at once), and in some embodiments also examines whether the user appeared to be working on two or more files together (e.g., if the user was switching back and forth between the files regularly).

The other operating system functions 835 include a wide variety of additional operating system features. Examples of such features include the ability to open and close applications (e.g., when a user selects an application item or one or more graphical representations of files), a file system manager for handling the files stored on the device, and numerous other features.

Finally, the networking module(s) 815 include various interfaces for wireless and/or wired communication. These may include an Ethernet interface, a Wi-Fi (802.11) interface, a cellular interface, etc. Through the network modules 815, the operating system (or other applications running on top of the operating system 800) can connect to remote locations accessible through the networks (e.g., via the Internet). These remote locations include the network storage server 855.

The network storage servers 855 are part of a network storage system, in some embodiments, to which the user of the electronic device on which operating system 800 runs has an account. The network storage system allows the user to store files on the servers 855, which the user can then access from any of several devices logged into the user's account with the system. The network storage system stores last access times for the user's files stored on the servers 855, which are retrieved by the operating system 800 for use in generating the recent files display of some embodiments.

III. Alternative or Additional Recent File Displays

The above section describes the recently open file display of some embodiments, in which graphical representations of recently open files are clustered according to the time that the files were recently opened. In different embodiments, the primary operating system GUI may include different visualizations of the recent files display. For example, different embodiments may not display the files in a chronological arrangement, may include files recently received on the electronic device (e.g., via e-mail), or may provide graphical application-specific recent files displays.

Figure 9:
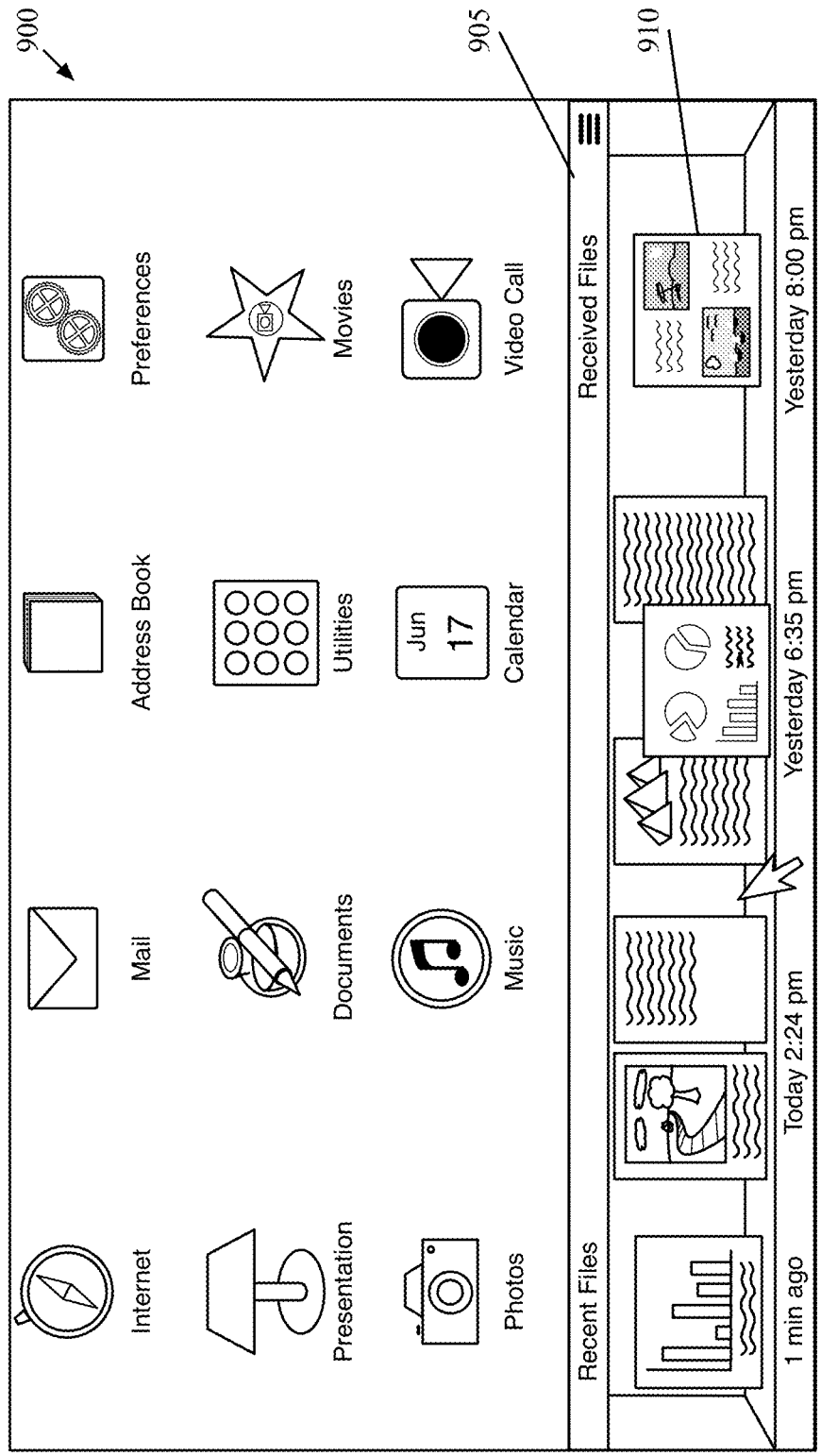
FIG. 9 illustrates a GUI with a recent files display that includes files recently received, but not necessarily opened.

FIG. 9 illustrates a GUI 900 of an electronic device with a recent files display 905 that includes files recently received, but not necessarily opened. Upon receiving input to display the recent files, the device displays graphical representations of the recently open files clustered by time in the GUI 900 (in the same manner as described above in the previous section). However, the display 905 also allocates a portion of space (in this example, on the graphical shelf) to files recently received on the electronic device. As mentioned, these might be received via e-mail, import from an external storage such as a solid-state memory device (e.g., a flash memory drive), SMS, or in another manner. In this case, three clusters of graphical representations are included for recently open files (similar to those described in the above section), and one graphical representation is shown for a file received at 8:00 pm on the previous day. In some embodiments, if multiple files are received together, the recent files display 905 will display clusters of graphical representations for these groups of files, which can also be opened together.

Figure 10:
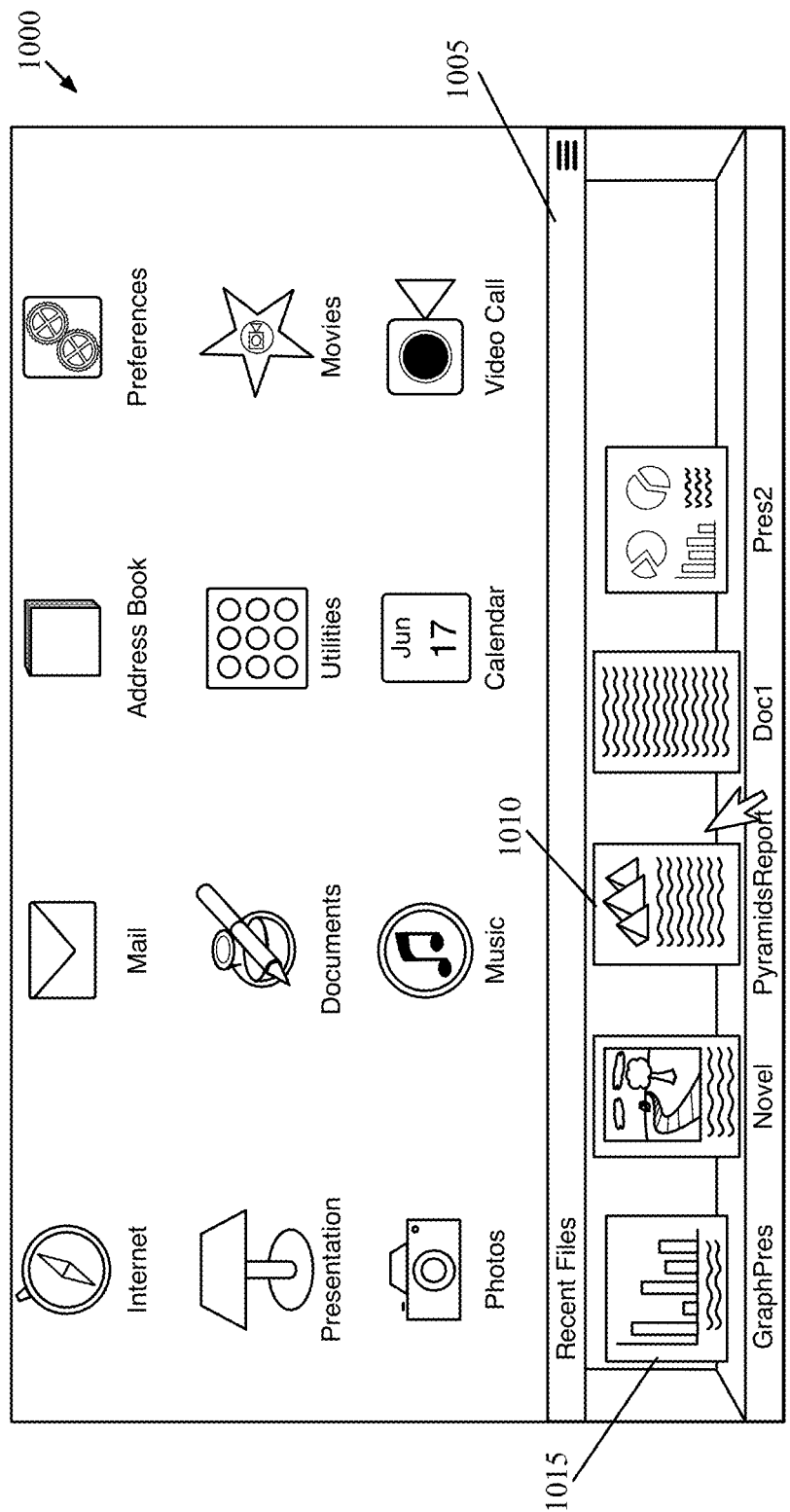
FIG. 10 illustrates a GUI with a recent files display that does not display the documents in time-associated clusters and displays file names with each individual document rather than the time at which the document was most recently opened.

FIG. 10 illustrates a GUI 1000 of an electronic device with a recent files display 1005 that does not display the documents in time-associated clusters and displays file names with each individual document rather than the time at which the document was most recently opened. Upon receiving input to display the recent files, the device displays graphical representations of the recently open files individually in the GUI 1000. In this case, like in the examples of the previous section, the display 1005 includes a graphical shelf on which the file representations are shown. Under each file representation is a name of the file (e.g., "PyramidsReport" for the graphical representation 1010 of a word processing document or "GraphPres" for the graphical representation 1015 of a slideshow presentation. In some embodiments, these graphical file representations are displayed in the same order as the other examples, starting from the most recently closed (or opened) file. Other embodiments may identify the most recently open files and order them alphabetically by file name, or using a different scheme.

Figure 11:
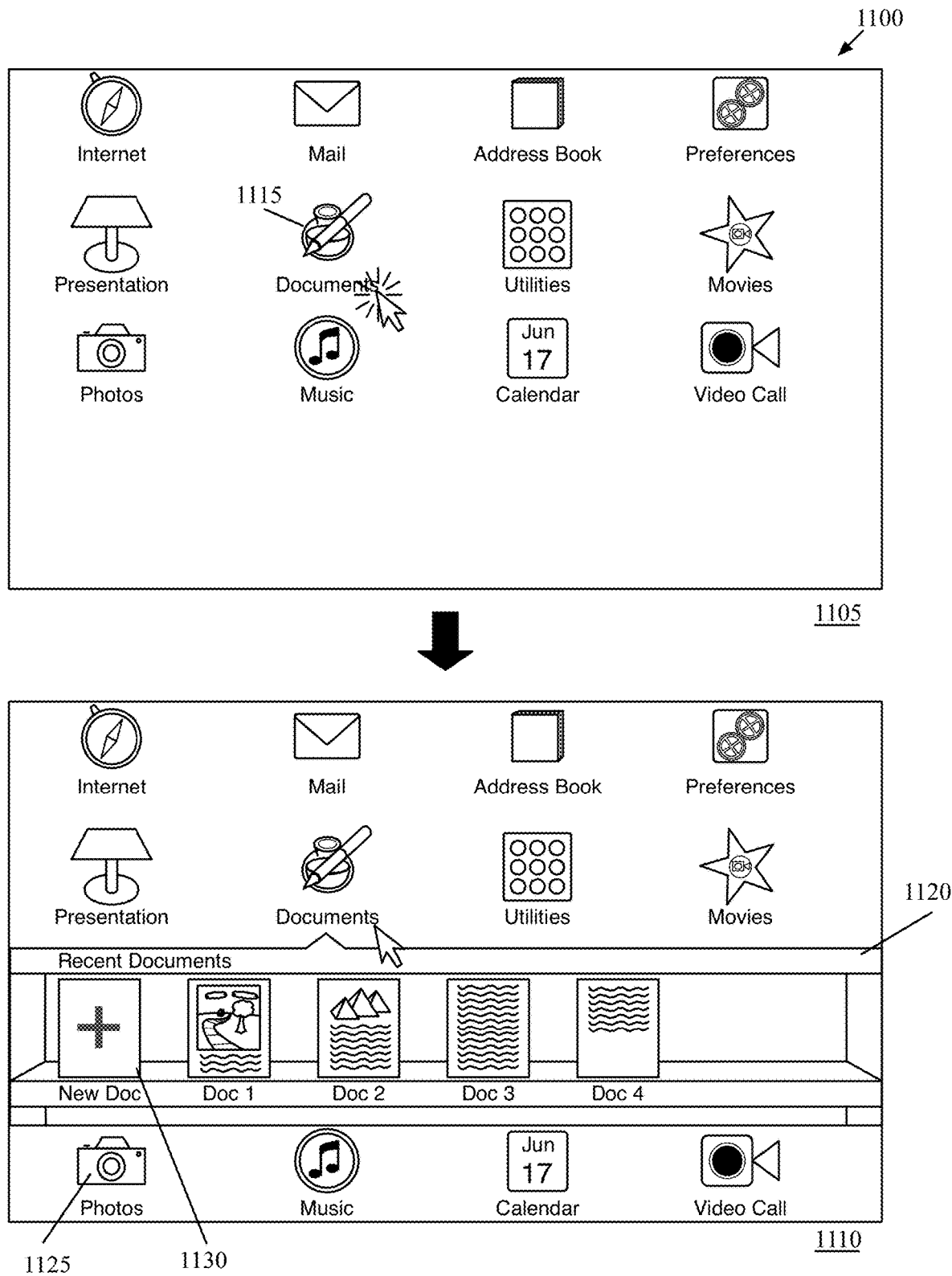
FIG. 11 illustrates a selection of an item representing an application in a GUI in order to view the recently open files for the selected application.

Some other embodiments, rather than grouping recent files for all of the applications into a single display, enable a user to select an application item and view graphical representations of the recently open files for that application. FIG. 11 illustrates such a selection of an item representing an application in a GUI 1100 in order to view the recently open files for the selected application, over two stages 1105-1110. In the first stage 1105, the user selects a selectable item 1115 in the GUI 1100 that corresponds to a word processing application. In some embodiments, the user provides a different type of selection input than that to simply open the application (e.g., a single click or single tap input versus a double click or double tap input). In some embodiments, the resulting display is a default result of the selection of the application item 1115.

The second stage 1110 illustrates the resulting display 1120 of recent files for the selected word processing application. This resulting display, in some embodiments, causes the movement in the GUI of application items that would otherwise be covered up by the display 1120 (e.g., the selectable item 1125 for a photo library application). In some embodiments, the recent files display 1120 is highlighted in the GUI as the remainder of the GUI is faded out, darkened, or otherwise de-emphasized. The recent files display 1120 of some embodiments, as shown, includes a selectable new document item 1130, as well as the selectable graphical representations for the four most recently open word-processing documents associated with the selected application. Some embodiments may enable both the recent files display 1120 for a particular application as well as the recent files for all applications displays from Section I in the same GUI.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 12:
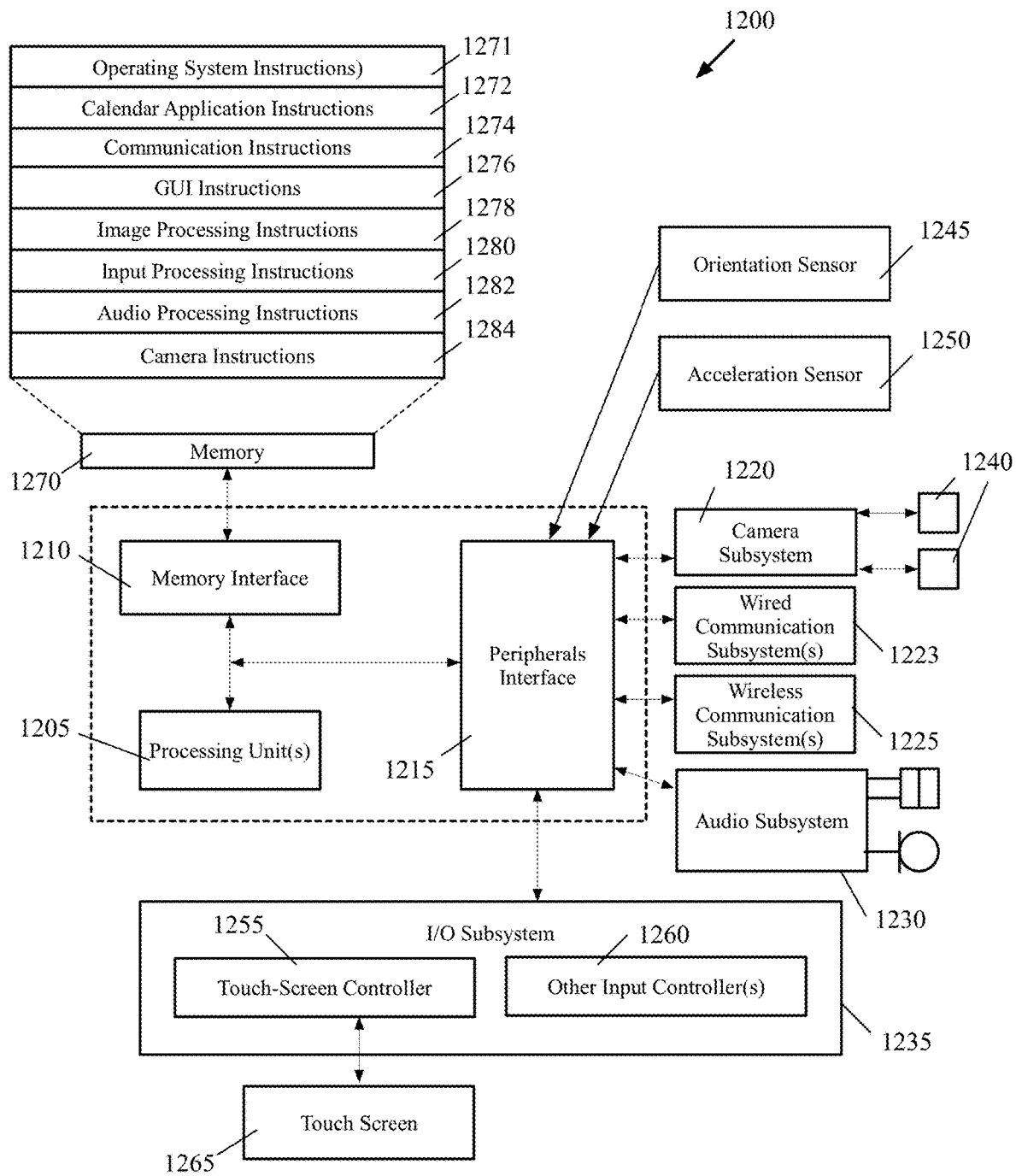
FIG. 12 is an example of an architecture of a mobile computing device of some embodiments.

The user data sharing of some embodiments occurs on mobile devices, such as smart phones (e.g., iPhones®) and tablets (e.g., iPads®). FIG. 12 is an example of an architecture 1200 of such a mobile computing device. As shown, the mobile computing device 1200 includes one or more processing units 1205, a memory interface 1210 and a peripherals interface 1215.

The peripherals interface 1215 is coupled to various sensors and subsystems, including a camera subsystem 1220, a wired communication subsystem(s) 1223, a wireless communication subsystem(s) 1225, an audio subsystem 1230, an I/O subsystem 1235, etc. The peripherals interface 1215 enables communication between the processing units 1205 and various peripherals. For example, an orientation sensor 1245 (e.g., a gyroscope) and an acceleration sensor 1250 (e.g., an accelerometer) is coupled to the peripherals interface 1215 to facilitate orientation and acceleration functions.

The camera subsystem 1220 is coupled to one or more optical sensors 1240 (e.g., a charged coupled device (CCD) optical sensor, a complementary metal-oxide-semiconductor (CMOS) optical sensor, etc.). The camera subsystem 1220 coupled with the optical sensors 1240 facilitates camera functions, such as image and/or video data capturing. The wired communication subsystem 1223 and wireless communication subsystem 1225 serve to facilitate communication functions.

In some embodiments, the wireless communication subsystem 1225 includes radio frequency receivers and transmitters, and optical receivers and transmitters (not shown in FIG. 12). These receivers and transmitters of some embodiments are implemented to operate over one or more communication networks such as a GSM network, a Wi-Fi network, a Bluetooth network, etc. The audio subsystem 1230 is coupled to a speaker to output audio (e.g., to output voice navigation instructions). Additionally, the audio subsystem 1230 is coupled to a microphone to facilitate voice-enabled functions in some embodiments.

The I/O subsystem 1235 involves the transfer between input/output peripheral devices, such as a display, a touch screen, etc., and the data bus of the processing units 1205 through the peripherals interface 1215. The I/O subsystem 1235 includes a touch-screen controller 1255 and other input controllers 1260 to facilitate the transfer between input/output peripheral devices and the data bus of the processing units 1205. As shown, the touch-screen controller 1255 is coupled to a touch screen 1265. The touch-screen controller 1255 detects contact and movement on the touch screen 1265 using any of multiple touch sensitivity technologies. The other input controllers 1260 are coupled to other input/control devices, such as one or more buttons. Some embodiments include a near-touch sensitive screen and a corresponding controller that can detect near-touch interactions instead of or in addition to touch interactions.

The memory interface 1210 is coupled to memory 1270. In some embodiments, the memory 1270 includes volatile memory (e.g., high-speed random access memory), non-volatile memory (e.g., flash memory), a combination of volatile and non-volatile memory, and/or any other type of memory. As illustrated in FIG. 12, the memory 1270 stores an operating system (OS) 1271. The OS 1271 includes instructions for handling basic system services and for performing hardware dependent tasks.

The memory 1270 additionally includes calendar application instructions 1272 in order for the device 1200 to execute the calendar application of some embodiments. The calendar application 1272 may include instructions to perform some or all of the various features described herein (e.g., processing touch interactions to resize the time scale of the calendar layout in the application GUI, handling time zone information for calendar appointments, processing a user's commenting on appointment invitations, scheduling appointments using the calendars of others, proposing appointments based on a user's calendar history, etc.).

The memory 1270 also includes communication instructions 1274 to facilitate communicating with one or more additional devices (e.g., for peer-to-peer data sharing, or to connect to a server through the Internet for cloud-based data sharing); graphical user interface instructions 1276 to facilitate graphic user interface processing; image processing instructions 1278 to facilitate image-related processing and functions; input processing instructions 1280 to facilitate input-related (e.g., touch input) processes and functions; audio processing instructions 1282 to facilitate audio-related processes and functions; and camera instructions 1284 to facilitate camera-related processes and functions. The instructions described above are merely exemplary and the memory 1270 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 12 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 12 may be split into two or more integrated circuits.

B. Computer System

Figure 13:
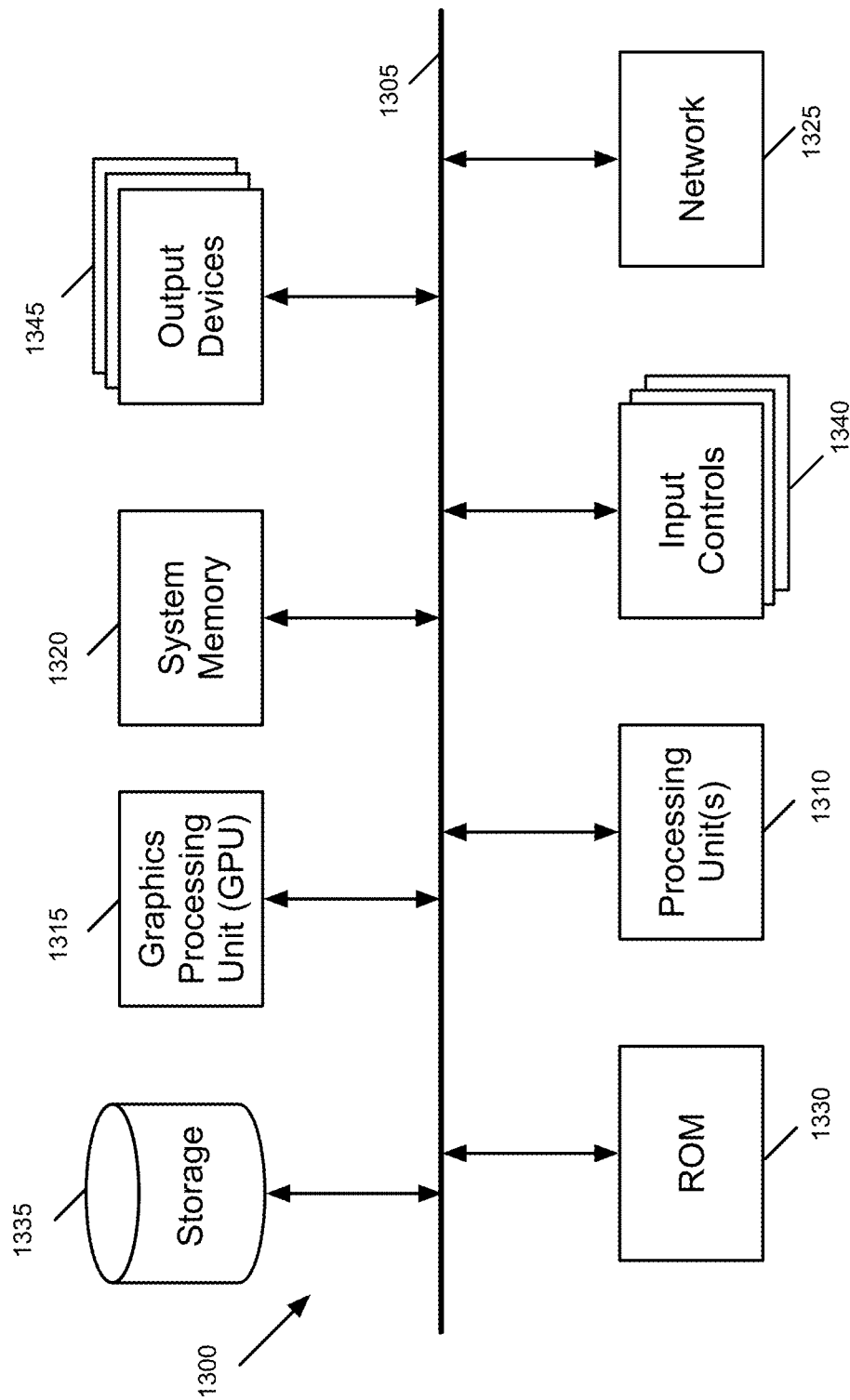
FIG. 13 conceptually illustrates an example of an electronic system with which some embodiments of the invention are implemented.

FIG. 13 conceptually illustrates another example of an electronic system 1300 with which some embodiments of the invention are implemented. The electronic system 1300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1300 includes a bus 1305, processing unit(s) 1310, a graphics processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the GPU 1315, the system memory 1320, and the permanent storage device 1335.

From these various memory units, the processing unit(s) 1310 retrieves instructions to execute and data to process in order to execute the processes of the invention. The processing unit(s) may be a single processor or a multi-core processor in different embodiments. Some instructions are passed to and executed by the GPU 1315. The GPU 1315 can offload various computations or complement the image processing provided by the processing unit(s) 1310. In some embodiments, such functionality can be provided using CoreImage's kernel shading language.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive, integrated flash memory) as the permanent storage device 1335.

Other embodiments use a removable storage device (such as a floppy disk, flash memory device, etc., and its corresponding drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor needs at runtime. In some embodiments, the invention's processes are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet), or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for displaying a graphical user interface (GUI) for an electronic device, the method comprising:
   receiving input to display files previously opened on the electronic device;
   in response to the input, displaying, in the graphical user interface for the electronic device, chronologically-arranged individually selectable graphical representations of individual files previously opened on the electronic device from a plurality of applications that operate on the electronic device, wherein:
      each of the individually selectable graphical representations corresponds to a single one of the individual files,
      the individual files are automatically chronologically-arranged, in the displayed graphical user interface, with respect to a time that each of the files was most recently opened or closed, and
      the individual files are automatically chronologically arranged, in the displayed graphical user interface, in a plurality of functional groups, a first group of the plurality of functional groups is selectable to initiate opening of a plurality of files in the first group so that the plurality of files in the first group are open concurrently, and a second group of the plurality of functional groups is selectable to initiate opening of a plurality of files in the second group so that the plurality of files in the second group are open concurrently;
   while displaying, in the graphical user interface, the chronologically-arranged individually selectable graphical representations of individual files, receiving a selection of a respective group of files from among the plurality of functional groups; and
   in response to receiving the selection of the respective group of files:
      in accordance with a determination that the respective group of files that is selected is the first group of files, opening the files represented by the first group without opening the files represented by the second group; and in accordance with a determination that the respective group of files that is selected is the second group of files, opening the files represented by the second group without opening files represented by the first group of files.

2. The method of claim 1, wherein the input comprises moving a location indicator to a particular location in the GUI.

3. The method of claim 1, wherein displaying the chronologically-arranged individually selectable graphical representations of individual files comprises animating bringing graphical representations of previously opened individual files from two or more applications into the GUI.

4. The method of claim 3 further comprising:
receiving a selection of a particular graphical item displayed as part of the graphical representations of previously opened individual files from two or more applications; and
in response to the selection, while continuing to display the graphical representations of previously opened individual files from two or more applications, animating bringing graphical representations of additional previously opened files into the GUI, wherein the additional previously opened files are the next files in chronological order.

5. The method of claim 1, wherein the graphical representations of individual files specify, for the first group, a time at which the files in the first group were most recently closed and specifies, for the second group, a time at which the files in the second group were most recently closed.

6. The method of claim 1, wherein the graphical representations of individual files specify, for the first group, a time at which the files in the first group were most recently opened and specifies, for the second group, a time at which the files in the second group were most recently opened.

7. The method of claim 1, wherein the individual files are automatically chronologically arranged in the plurality of functional groups based on a determination that the files in each group were most recently opened or closed within a predetermined duration of each other.

8. The method of claim 1, wherein opening the files represented by the first group comprises:
identifying a state of the GUI with the files represented by the first group open; and
restoring the GUI to the identified state, with the files opened in a same location as in the identified state.

9. The method of claim 1, wherein the GUI in which the chronologically-arranged individually selectable graphical representations of the individual files are displayed is a primary GUI of an operating system of the electronic device that comprises a plurality of selectable application icons representing different applications.

10. The method of claim 9 further comprising:
receiving a selection of one of the selectable application icons representing a particular application; and
highlighting the graphical representations of the individual files pertaining to only the particular application.

11. The method of claim 1, wherein the chronologically-arranged individually selectable graphical representations of the individual files comprises thumbnail previews of a plurality of the individual files, and the plurality of functional groups are displayed as distinct clusters of the graphical representations of the individual files.

12. The method of claim 11, wherein the graphical user interface comprises concurrently displayed first and second regions, the first region comprising a timeline view of the chronologically-arranged individually selectable graphical representations of the individual files and the second region comprising a plurality of application icons for opening corresponding applications.

13. The method of claim 1, wherein displaying chronologically-arranged individually selectable graphical representations of individual files includes displaying the individually selectable graphical representations in one or more rows in chronological order, wherein each group of the plurality of functional groups is displayed as a cluster of individually selectable graphical representations of individual files grouped together visually in the one or more rows.

14. The method of claim 1, wherein the selection of the respective group of files comprises a first selection input, and the method further includes, while displaying the chronologically-arranged individually selectable graphical representations of individual files, receiving a second selection input comprising selection of an individual file in the respective group of files.

15. A non-transitory machine readable medium storing one or more programs which when executed by at least one processing unit display a graphical user interface (GUI) for an electronic device, the one or more programs comprising sets of instructions for:
receiving input to display files previously opened on the electronic device; and
in response to the input, displaying, in the graphical user interface for the electronic device, chronologically-arranged individually selectable graphical representations of individual files previously opened on the electronic device from a plurality of applications that operate on the electronic device, wherein:
each of the individually selectable graphical representations corresponds to a single one of the individual files,
the individual files are automatically chronologically-arranged, in the displayed graphical user interface, with respect to a time that each of the files was most recently opened or closed, and
the individual files are automatically chronologically arranged, in the displayed graphical user interface, in a plurality of functional groups, a first group of the plurality of functional groups is selectable to initiate opening of a plurality of files in the first group so that the plurality of files in the first group are open concurrently, and a second group of the plurality of functional groups is selectable to initiate opening of a plurality of files in the second group so that the plurality of files in the second group are open concurrently;
while displaying the chronologically-arranged individually selectable graphical representations of individual files, receiving a selection of a respective group of files from among the plurality of functional groups; and
in response to receiving the selection of the respective group of files:
in accordance with a determination that the respective group of files that is selected is the first group of files, opening the files represented by the first group without opening the files represented by the second group; and
in accordance with a determination that the respective group of files that is selected is the second group of files, opening the files represented by the second group without opening files represented by the first group of files.

16. The non-transitory machine readable medium of claim 15, wherein the set of instructions for displaying the chronologically-arranged individually selectable graphical representations of individual files comprises instructions for animating bringing graphical representations of previously opened individual files from two or more applications into the GUI.

17. The non-transitory machine readable medium of claim 16, wherein the one or more programs include instructions for:
receiving a selection of a particular graphical item displayed as part of the graphical representations of previously opened files from two or more applications; and
in response to the selection, while continuing to display the graphical representations of previously opened individual files from two or more applications, animating bringing graphical representations of additional previously opened files into the GUI, wherein the additional previously opened files are the next files in chronological order.

18. The non-transitory machine readable medium of claim 15, wherein the graphical representations of individual files specify, for the first group, a time at which the files in the first group were most recently closed and specifies, for the second group, a time at which the files in the second group were most recently closed.

19. The non-transitory machine readable medium of claim 15, wherein the graphical representations of individual files specify, for the first group, a time at which the files in the first group were most recently opened and specifies, for the second group, a time at which the files in the second group were most recently opened.

20. The non-transitory machine readable medium of claim 15, wherein the individual files are automatically chronologically arranged in the plurality of functional groups based on a determination that the files in each group were most recently opened or closed within a predetermined duration of each other.

21. The non-transitory machine readable medium of claim 15, wherein opening the files represented by the first group comprises:
identifying a state of the GUI with the files represented by the first group open; and
restoring the GUI to the identified state, with the files opened in a same location as in the identified state.

22. The non-transitory machine readable medium of claim 15, wherein the GUI in which the chronologically-arranged individually selectable graphical representations of the individual files are displayed is a primary GUI of an operating system of the electronic device that comprises a plurality of selectable application icons representing different applications.

23. The non-transitory machine readable medium of claim 22, wherein the one or more programs include instructions for:
receiving a selection of one of the selectable application icons representing a particular application; and
highlighting the graphical representations of the individual files pertaining to only the particular application.

24. The non-transitory machine readable medium of claim 15, wherein the chronologically-arranged individually selectable graphical representations of the individual files comprises thumbnail previews of a plurality of the individual files, and the plurality of functional groups are displayed as distinct clusters of the graphical representations of the individual files.

25. The non-transitory machine readable medium of claim 15, wherein the selection of the respective group of files comprises a first selection input, and the one or more programs include instructions for, while displaying the chronologically-arranged individually selectable graphical representations of individual files, receiving a second selection input comprising selection of an individual file in the respective group of files.

26. The non-transitory machine readable medium of claim 15, wherein the graphical user interface comprises concurrently displayed first and second regions, the first region comprising a timeline view of the chronologically-arranged individually selectable graphical representations of the individual files and the second region comprising a plurality of application icons for opening corresponding applications.

27. An electronic device comprising:
a set of processing units; and
a machine readable medium storing one or more programs which when executed by at least one processing unit display a graphical user interface (GUI) for an electronic device, the one or more programs comprising sets of instructions for:
receiving input to display files previously opened on the electronic device; and
in response to the input, displaying, in the graphical user interface for the electronic device, chronologically-arranged individually selectable graphical representations of individual files previously opened on the electronic device from a plurality of applications that operate on the electronic device, wherein:
each of the individually selectable graphical representations corresponds to a single one of the individual files,
the individual files are automatically chronologically-arranged, in the displayed graphical user interface, with respect to a time that each of the files was most recently opened or closed, and
the individual files are automatically chronologically arranged, in the displayed graphical user interface, in a plurality of functional groups, a first group of the plurality of functional groups is selectable to initiate opening of a plurality of files in the first group so that the plurality of files in the first group are open concurrently, and a second group of the plurality of functional groups is selectable to initiate opening of a plurality of files in the second group so that the plurality of files in the second group are open concurrently;
while displaying the chronologically-arranged individually selectable graphical representations of individual files, receiving a selection of a respective group of files from among the plurality of functional groups; and
in response to receiving the selection of the respective group of files:
in accordance with a determination that the respective group of files that is selected is the first group of files, opening the files represented by the first group without opening the files represented by the second group; and
in accordance with a determination that the respective group of files that is selected is the second group of files, opening the files represented by the second group without opening files represented by the first group of files.

28. The electronic device of claim 27, wherein the one or more programs include instructions for:

automatically chronologically arranging the individual files in the plurality of functional groups based on a determination that the files in each group were most recently opened or closed within a predetermined duration of each other.

29. The electronic device of claim 27, wherein the instructions for opening the files represented by the first group include instructions for:
identifying a state of the GUI with the files represented by the first group open; and
restoring the GUI to the identified state, with the files opened in a same location as in the identified state.

30. The electronic device of claim 27, wherein the GUI in which the chronologically-arranged individually selectable graphical representations of the individual files are displayed is a primary GUI of an operating system of the electronic device that comprises a plurality of selectable application icons representing different applications.

31. The electronic device of claim 30, wherein the one or more programs include instructions for:
receiving a selection of one of the selectable application icons representing a particular application; and
highlighting the graphical representations of the individual files pertaining to only the particular application.

32. The electronic device of claim 27, wherein displaying the chronologically-arranged individually selectable graphical representations of individual files comprises animating bringing graphical representations of previously opened individual files from two or more applications into the GUI.

33. The electronic device of claim 32, wherein the one or more programs include instructions for:
receiving a selection of a particular graphical item displayed as part of the graphical representations of previously opened individual files from two or more applications; and
in response to the selection, while continuing to display the graphical representations of previously opened individual files from two or more applications, animating bringing graphical representations of additional previously opened files into the GUI, wherein the additional previously opened files are the next files in chronological order.

34. The electronic device of claim 27, wherein the graphical representations of individual files specify, for the first group, a time at which the files in the first group were most recently closed and specifies, for the second group, a time at which the files in the second group were most recently closed.

35. The electronic device of claim 27, wherein the graphical representations of individual files-specify, for the first group, a time at which the files in the first group were most recently opened and specifies, for the second group, a time at which the files in the second group were most recently opened.

36. The electronic device of claim 27, wherein the selection of the respective group of files comprises a first selection input, and the one or more programs include instructions for, while displaying the chronologically-arranged individually selectable graphical representations of individual files, receiving a second selection input comprising selection of an individual file in the respective group of files.

37. The electronic device of claim 36, wherein the graphical user interface comprises concurrently displayed first and second regions, the first region comprising a timeline view of the chronologically-arranged individually selectable graphical representations of the individual files and the second region comprising a plurality of application icons for opening corresponding applications.

* * * * *